United States Patent
Albers et al.

(10) Patent No.: US 8,333,895 B2
(45) Date of Patent: Dec. 18, 2012

(54) WATER TREATMENT POND, SYSTEM AND METHOD OF USE

(76) Inventors: Cory Albers, Calgary (CA); Bernard Amell, Calgary (CA)

(*) Notice: Subject to any disclaimer, the term of this patent is extended or adjusted under 35 U.S.C. 154(b) by 318 days.

(21) Appl. No.: 12/783,113

(22) Filed: May 19, 2010

(65) Prior Publication Data
US 2010/0300981 A1   Dec. 2, 2010

Related U.S. Application Data

(60) Provisional application No. 61/181,163, filed on May 26, 2009.

(51) Int. Cl.
*B01D 21/26* (2006.01)
*E03F 5/14* (2006.01)

(52) U.S. Cl. .......... 210/747.2; 210/747.9; 210/788; 210/801; 210/170.03; 210/512.1; 210/519; 210/532.1

(58) Field of Classification Search .......... 210/747.2, 210/747.5, 747.9, 787, 788, 801, 170.03, 210/170.09, 512.1, 519, 532.1, 540
See application file for complete search history.

(56) References Cited

U.S. PATENT DOCUMENTS

| | | | | |
|---|---|---|---|---|
| 3,832,854 A * | 9/1974 | Metts | | 210/170.09 |
| 3,962,084 A * | 6/1976 | Nussbaum | | 210/747.2 |
| 4,976,875 A * | 12/1990 | Ryynanen | | 210/788 |
| 5,314,619 A * | 5/1994 | Runyon | | 210/170.09 |
| 6,068,773 A * | 5/2000 | Sheaffer | | 210/170.09 |
| 6,077,423 A * | 6/2000 | Roy et al. | | 210/170.03 |
| 6,171,498 B1 * | 1/2001 | Fassbender et al. | | 210/512.1 |
| 6,547,962 B2 * | 4/2003 | Kistner et al. | | 210/170.03 |
| 6,821,426 B1 * | 11/2004 | Hausin et al. | | 210/747.9 |
| 2005/0077248 A1 * | 4/2005 | Stark et al. | | 210/519 |

* cited by examiner

*Primary Examiner* — Christopher Upton
(74) *Attorney, Agent, or Firm* — Sean W. Goodwin; Linda M. Thompson

(57) ABSTRACT

A pond receives a flow of contaminated water into the pond substantially tangential to a volume of clarified water which is stored in the pond and which is largely quiescent. The tangential inflow overcomes a large rotational inertia in the stored volume of clarified water and establishes a slow spiral flow path about the periphery of the pond and inwards to a central outlet. The clarified stored water is discharged ahead of the inflowing contaminated water increasing the residence time of the contaminated water in the pond and permitting contaminants to receive at least partial treatment, such as settling of sediment, in the pond.

28 Claims, 24 Drawing Sheets
(11 of 24 Drawing Sheet(s) Filed in Color)

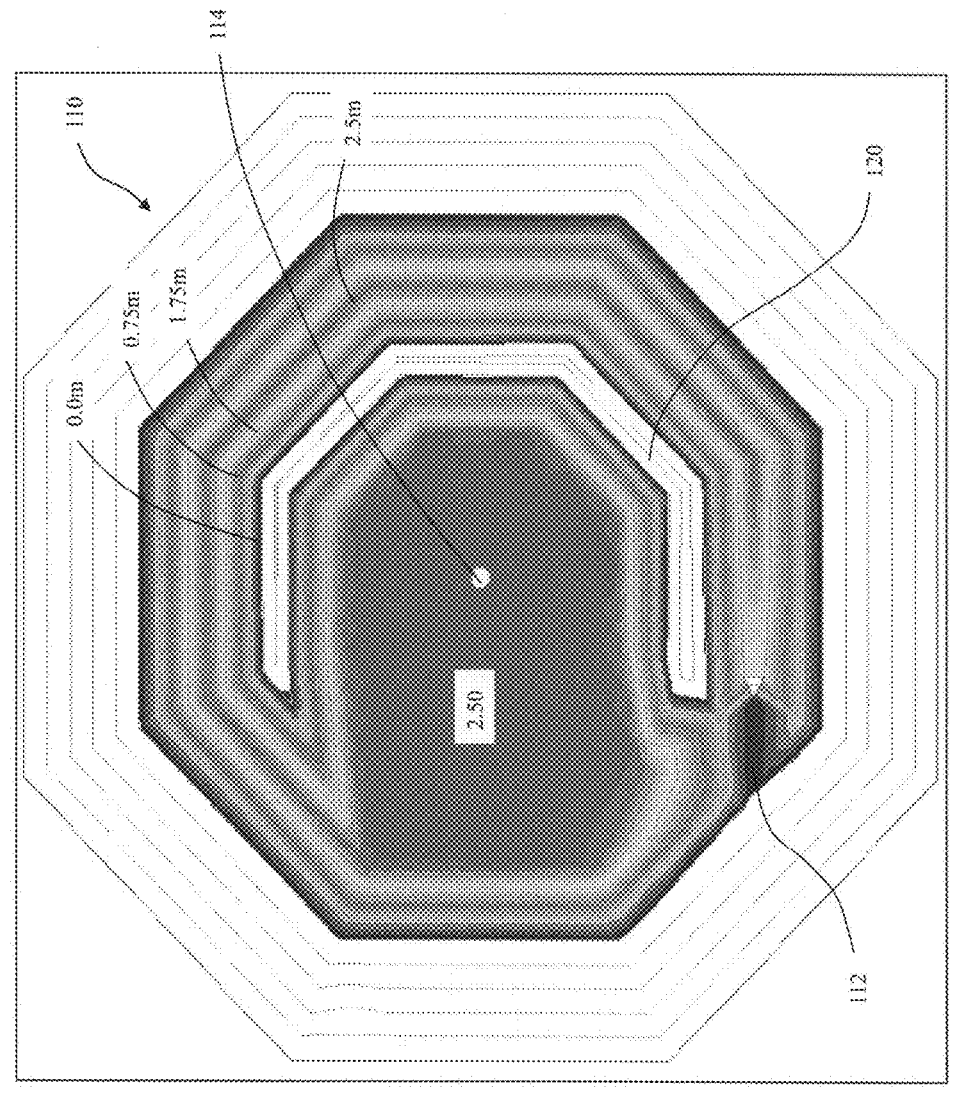

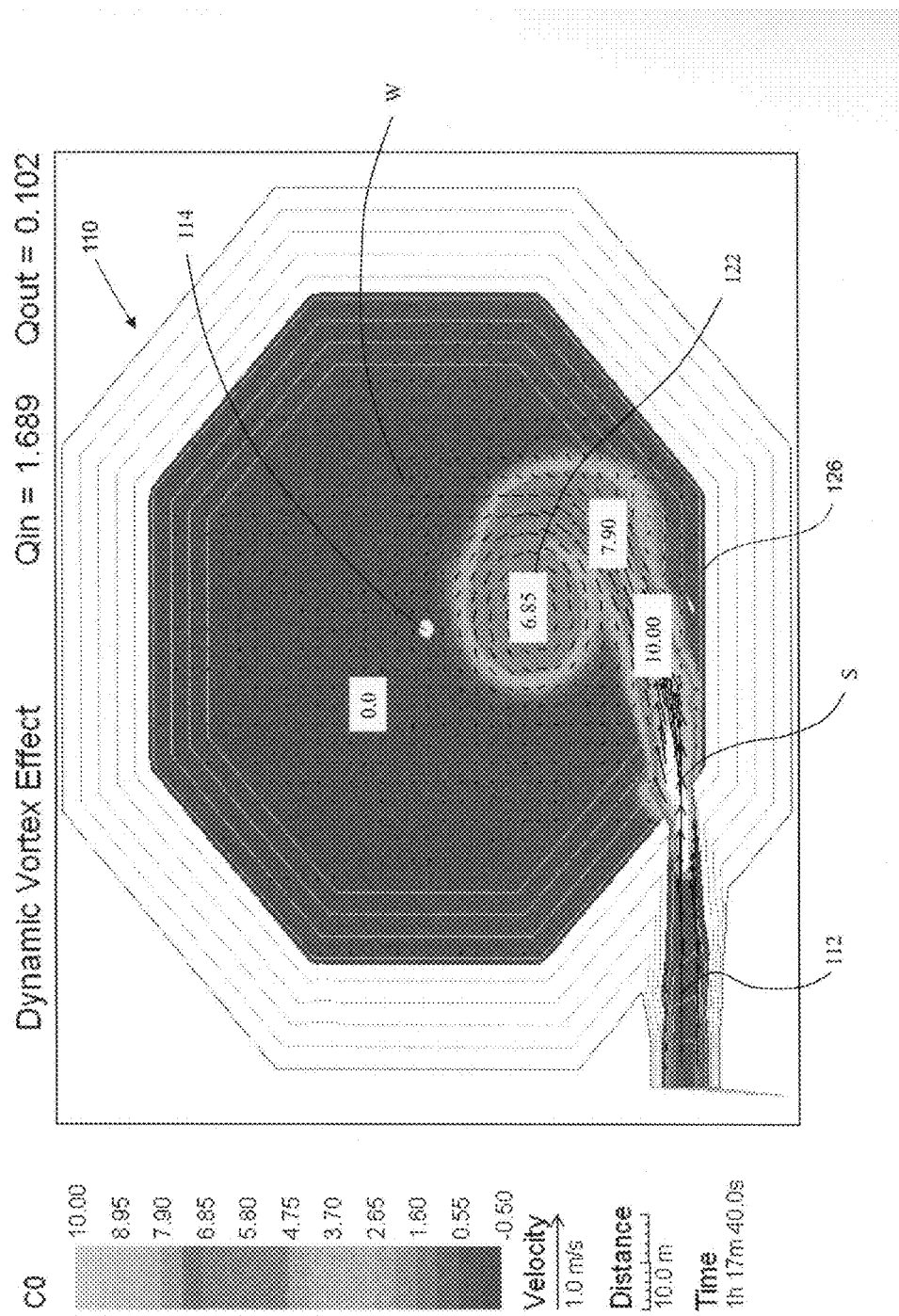

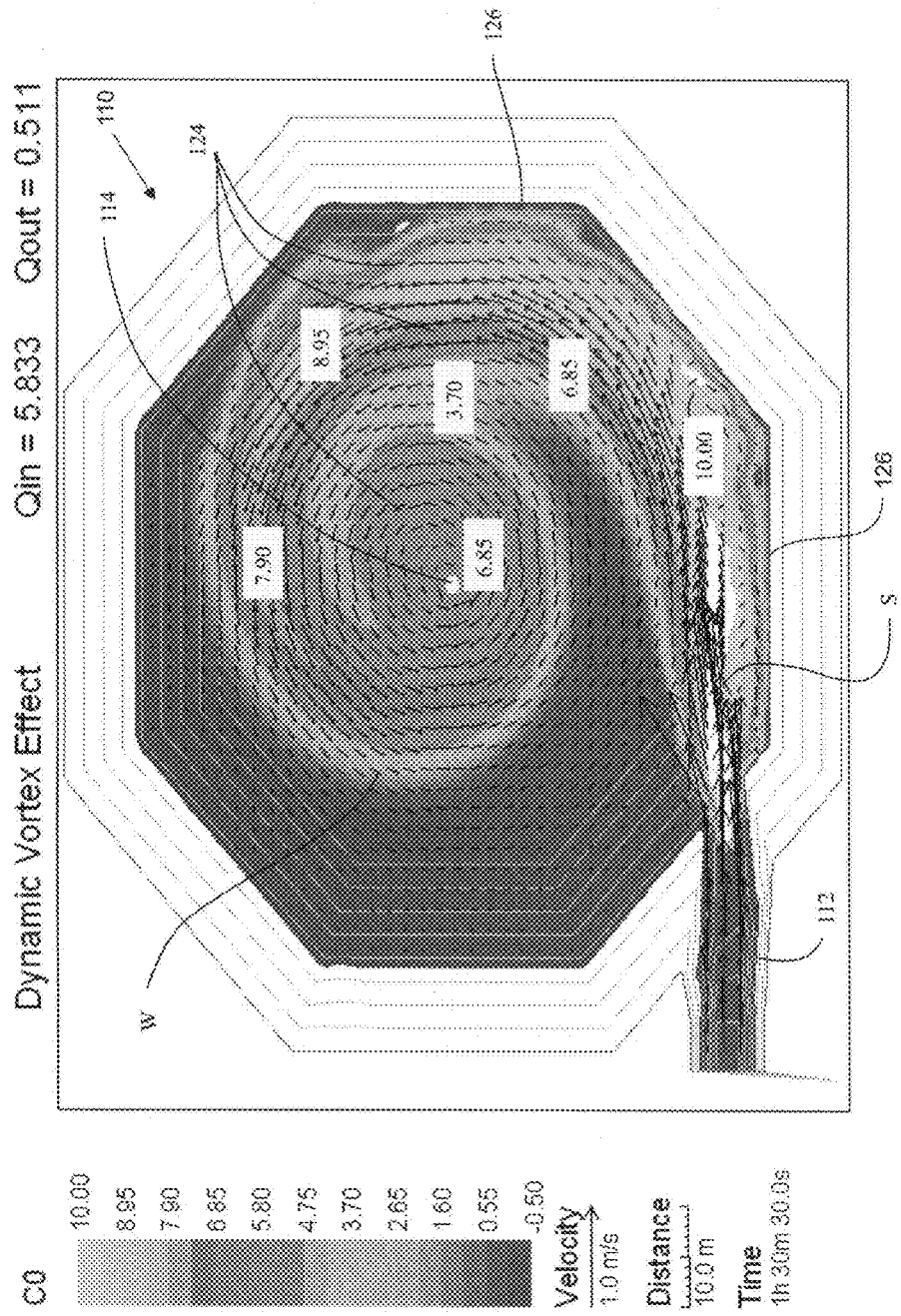

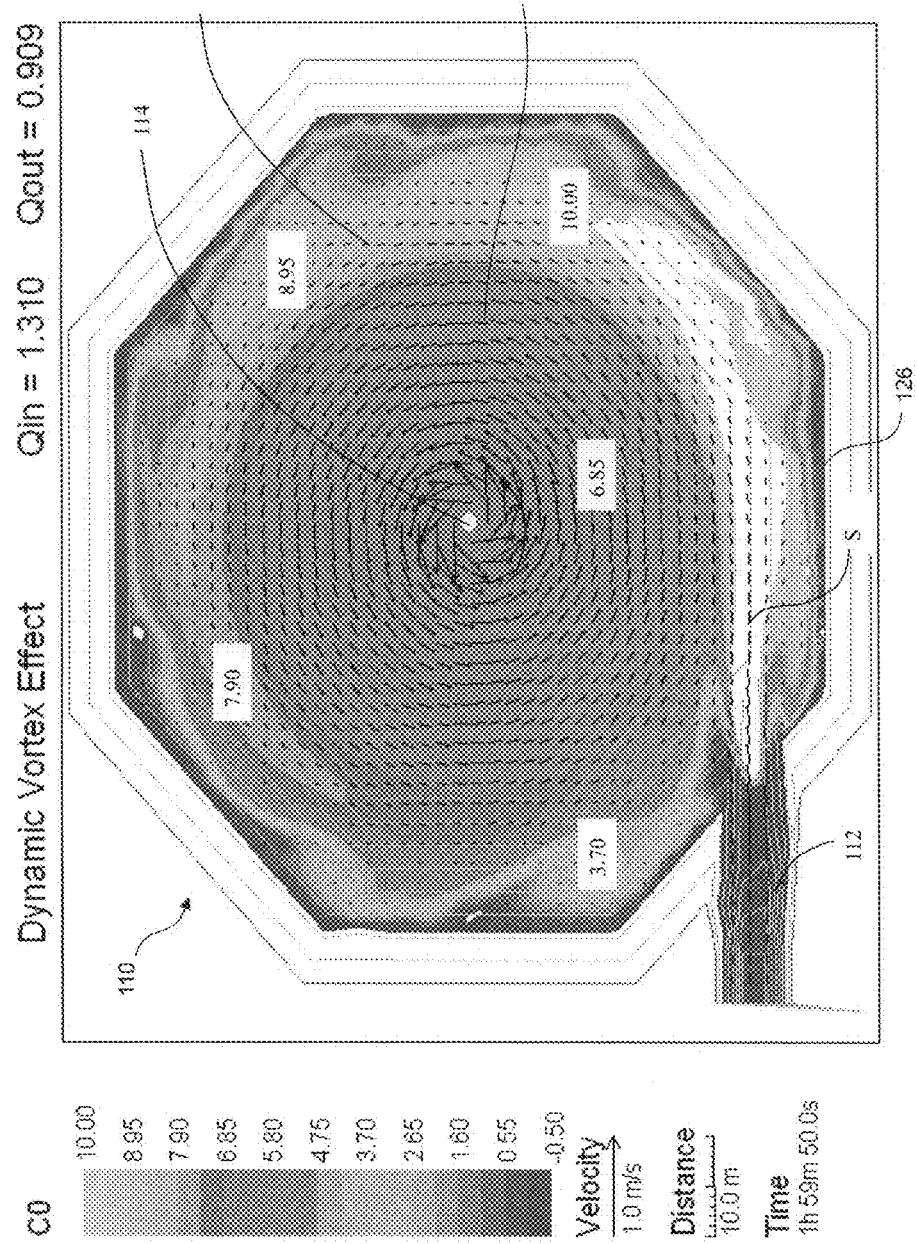

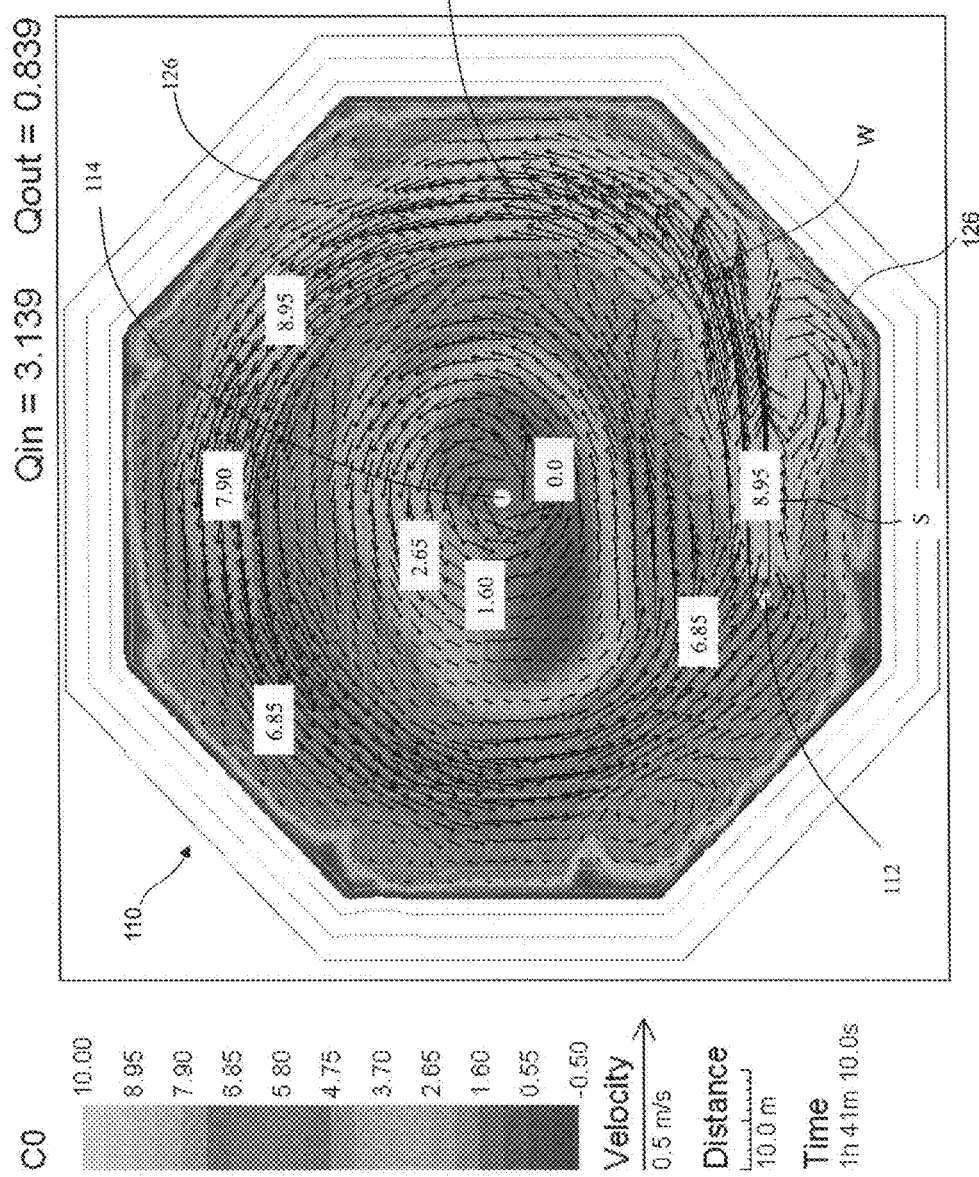

WATER TREATMENT POND, SYSTEM AND METHOD OF USE

CROSS REFERENCE TO RELATED APPLICATION

This application claims the benefit of U.S. Provisional Patent application Ser. No. 61/181,163, filed May 26, 2009, the entirety of which is incorporated herein by reference.

FIELD OF THE INVENTION

Embodiments of the invention relate to the management and treatment of contaminated water streams and more particularly to a pond and flow therethrough for handling and treating large influxes of contaminated water and contaminants contained therein, such as is the case with stormwater runoff.

BACKGROUND OF THE INVENTION

It is well known within contaminated water treatment and management systems to provide ponds for collecting and treating a variety of contaminated water streams including but not limited to industrial waste water, municipal waste water and stormwater.

In the case of stormwater management systems, it is well known to provide upstream forebays or ponds which are intended to receive stormwater runoff, in large volumes and having large peak inflow rates. Such ponds typically act to perform an initial clarification of the stormwater to remove at least a portion of the sediment and/or other pollutants or contaminants carried with the runoff before routing the stormwater to additional downstream means for removing pollutants and particulates therein and ultimately into streams, rivers or lakes within the local watershed.

Stormwater ponds collect, clarify and transport runoff water throughout the local watershed. The ponds are a passive means of treatment as they are largely unmonitored and not actively managed. The collection, clarification and transport is generally accomplished through the configuration of the ponds, storage volumes within the ponds or cells contained within the ponds, flow paths connected therebetween, relative elevations of the interconnected ponds and the like. Vegetation in the ponds may assist with the clarification and transport processes as is known in the art.

Generally, the forebay or upstream collection pond is separated from downstream ponds by a berm or spillway which feeds at least partially clarified water to the downstream pond. The berm or spillway may or may not be submerged in the pond. Such spillways may be constructed of materials which act to filter the water therethrough, such as packed gravel or the like or may simply form a diversion or outlet through which the water is directed. Generally, the minimum water elevation in an upstream pond is governed by the minimum elevation of the spillway that serves as the upstream pond outlet. Typically, the spillway is at the periphery of the pond and can be a weir, a pipe or other means.

In the event of a storm, runoff water from the upstream pond typically overflows the spillway opening, carrying contaminants such as sediment and other contaminants therewith, thus contaminating the downsteam ponds.

Conventional ponds are often assumed to have a plug flow which is analogous to pipe flow wherein inflowing water displaces in situ water. Alternatively, conventional ponds are thought to have a well-mixed reactor flow pattern which assumes new water entering the pond is instantly mixed and diluted with the in situ water. It has been found however that neither conventional assumption appropriately describes the manner in which a pond typically functions. Conventional water ponds, designed based upon these assumptions, therefore suffer from reduced treatment effectiveness and may have undesirable effects such as sediment deposition in undesirable locations and concentration and periodic release of cumulative pollutants to downstream waters.

There is great interest in providing an upstream pond which is capable of receiving large volumes of contaminated water entering the pond at high inflow rates and which is capable of providing effective and predictable treatment while achieving a reduction in the downstream carryover of sediment, oils or other undesirable contaminants, relative to the current state of the art.

SUMMARY OF THE INVENTION

Embodiments of the invention create a slow spiral flow path from an inlet to a central discharge of contaminated water entering a pond which displaces substantially clarified resident water in the pond ahead of the inflow of contaminated water for discharging the substantially clarified water at the central outlet and for increasing the residence time of the inflowing contaminated water in the pond to permit clarification of the contaminated water therein.

In a broad aspect of the invention, a pond for receiving and flowing an inflow of contaminated water therethrough, the pond comprising: a pond basin for substantially containing the inflow of contaminated water, the pond having a pond volume comprising at least a resident volume being initially substantially quiescent and having a large rotational inertia prior to receiving the inflow of contaminated water; an inlet for introducing the inflow of contaminated water to the pond substantially tangential to a periphery of the pond, thereto; and an outlet positioned at about a centre of the pond for discharging at least a portion of the pond volume therethrough, the outlet being at an elevation above a bottom of the pond for maintaining the at least a resident volume in the pond, the discharging of the at least a portion of the pond volume therefrom and the inflow of contaminated water at the inlet causing the pond volume to flow in a spiral flow path from the inlet to the outlet, wherein at least a portion of the resident volume is directed to the outlet, ahead of the inflow of contaminated water, a hydraulic retention time of the contaminated water in the pond being sufficiently long so as to permit removal of at least a portion of the contaminants therein and to discharge a substantially clarified water stream at the central outlet.

Tangential features may be positioned in the pond adjacent the inlet to assist with directing the inflow of contaminated water tangential to the pond's periphery. Additionally, other structures or equipment, such as berms, geotextile curtain walls, surface flow-resistance elements or continuously or intermittently operating circulation pumps may be positioned in the pond to aid in developing and maintaining the spiral flow path.

In another broad aspect, A method for clarifying an inflow of contaminated water therein to a pond, the pond having a substantially clarified, resident volume of water having a large rotational inertia and being substantially quiescent therein, the method comprising: flowing the inflow of contaminated water through an inlet, substantially tangential to a periphery of the resident volume of water for displacing at least a portion of the resident volume of water toward a central outlet; and continuing to flow the inflow of contaminated water through the inlet for overcoming the large rotational inertia of the resident volume of water and expanding an initial tight leading edge vortex to form an expanding spiral flow path for directing at least a portion of the resident volume of water toward the central outlet, wherein the inflow of contaminated water overcomes the large rotational inertia of the resident water for expanding the expanding spiral flow path to flow substantially about the periphery of the pond and slowly to the central outlet, increasing a hydraulic retention time of the inflow of contaminated water within the pond permitting removal of at least a portion of the contaminants therein to the pond.

In yet another broad aspect, a system for clarification of contaminated water comprises: an upstream pond and one or more downstream ponds, according to an embodiment of the invention, wherein a substantially clarified stream discharged from the central outlet of the upstream pond is directed to an inlet of at least one of the one or more downstream ponds.

The storage capacity of the downstream ponds may be greater than that of the upstream pond and further, the one or more of the ponds may be wetlands.

BRIEF DESCRIPTION OF THE DRAWINGS

The patent or application file contains at least one drawing executed in color. Copies of this patent or patent application with color drawing(s) will be provided by the Office upon request and payment of the necessary fee.

FIG. 2A illustrates an initial flow path in the prior art pond wherein an initial surge of contaminated stormwater entering the water already in the pond induces an initial tight leading edge vortex flow pattern that rapidly expands in size while moving toward a centre of the pond;

FIG. 2B illustrates the further developing flow path in the prior art pond of FIG. 2A, through the pond whereby additional contaminated stormwater inflows to the pond, further developing and expanding the leading edge vortex pattern to occupy the centre of the pond to approximately half the pond radius so that additional inflows begin to flow along a pathway extending to about a periphery of the pond;

FIG. 2C illustrates that the contaminated stormwater flowing in the prior art pond of FIG. 2A near the periphery is caused to avoid the centre portion of the pond and instead follows an overflow at the spillway carrying contaminants therewith to a next stage of the system;

FIG. 2D illustrates another prior art pond having an inlet at one side of the pond and an outlet at an opposing side of the pond; and FIG. 2E illustrates the flow pattern of contaminated stormwater in the prior art pond of FIG. 2D, the water overflowing at the outlet carrying contaminants therewith to a next stage of the system

FIG. 4 is a plan view of the pond of FIG. 3 illustrating a substantially tangential feature or component located in the pond, a top of which is substantially at or above the surface of the water in the pond to direct the inflow tangential to the periphery of the storage volume of water in the pond, the tangential inlet being located within the pond;

FIGS. 5A-5C are plan views of a pond according to FIG. 3, illustrating flow patterns of the contaminated stormwater therein over time, according to the stormwater event of FIG. 1A, more particularly, FIG. 5A illustrates an initial flow path whereby an initial surge of contaminated stormwater entering the water already in the pond induces a tight leading edge vortex pattern that rapidly expands in size while moving toward the centre of the pond and toward the central outlet;

FIG. 5B illustrates the further developing flow path through the pond whereby additional contaminated stormwater inflows to the pond further developing and expanding the leading edge vortex pattern to occupy the centre of the pond to approximately half the pond radius so that additional inflows begin to flow along a pathway extending to about the periphery of the pond; and FIG. 5C illustrates the developed flow path through the pond whereby additional contaminant-laden stormwater flows along an open spiral pathway which at its greatest extent flows about the periphery of the pond for removal of contaminants thereabout and which spirals gradually toward the central outlet for discharging at least partially clarified water therethrough;

FIG. 6 is a plan view of the pond of FIG. 4 illustrating the developed spiral flow path through the pond, the substantially tangential feature having been submerged in the pond by the inflowing stormwater.

DETAILED DESCRIPTION OF THE PREFERRED EMBODIMENTS

Ponds, according to embodiments of the invention, are useful in retaining and treating stormwater runoff as well as contaminated water streams from a variety of industrial process which include, but are not limited to, waste water from industries such as agriculture, mining, iron and steel mills, food-related industries, chemical and pharmaceutical industries.

For the purposes of the description, the ponds, systems and methods of use are described herein in the context of stormwater management. One of skill in the art would understand that the concepts described herein are applicable to a wide variety of other industrial and municipal waste water streams.

Figure 1A:
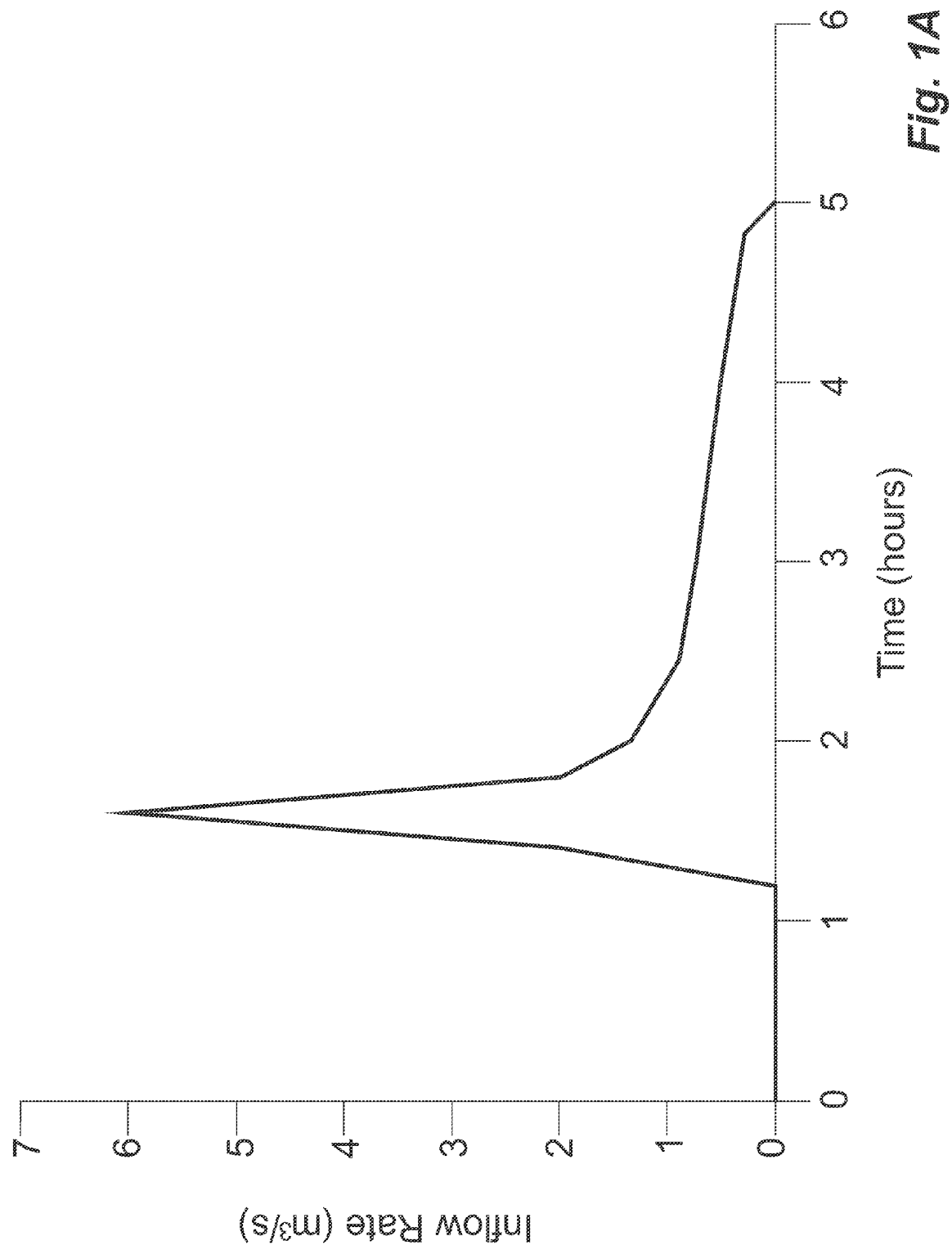
FIG. 1A is a graphical representation of a stormwater event illustrating a peak volume of water rapidly produced therein.

In the case of stormwater, the influx to ponds is episodic, typically following the hydrograph as illustrated in FIG. 1A. In the case of other contaminated water streams, the influx to the pond may be substantially continuous or may be episodic. In some cases the influx may be manipulated to be much like that of a stormwater influx during a storm event, the influx being generated from a substantially continuous waste water stream by alternating delivery of the stream to two or more receiving ponds or by periodically opening and closing discharge means from an upstream pond or contaminated water impoundment facility.

Prior Art

Referring again to FIG. 1A, when a storm event occurs over a catchment area draining to a stormwater pond, stormwater enters the stormwater pond and rapidly rises to a very high inflow rate, such as seen at about 1.5 hours. After the rapid rise in inflow rate, an inflow hydrograph typically shows a rapid fall in the inflow rate to a moderate level which gradually diminishes thereafter.

Figure 1B:
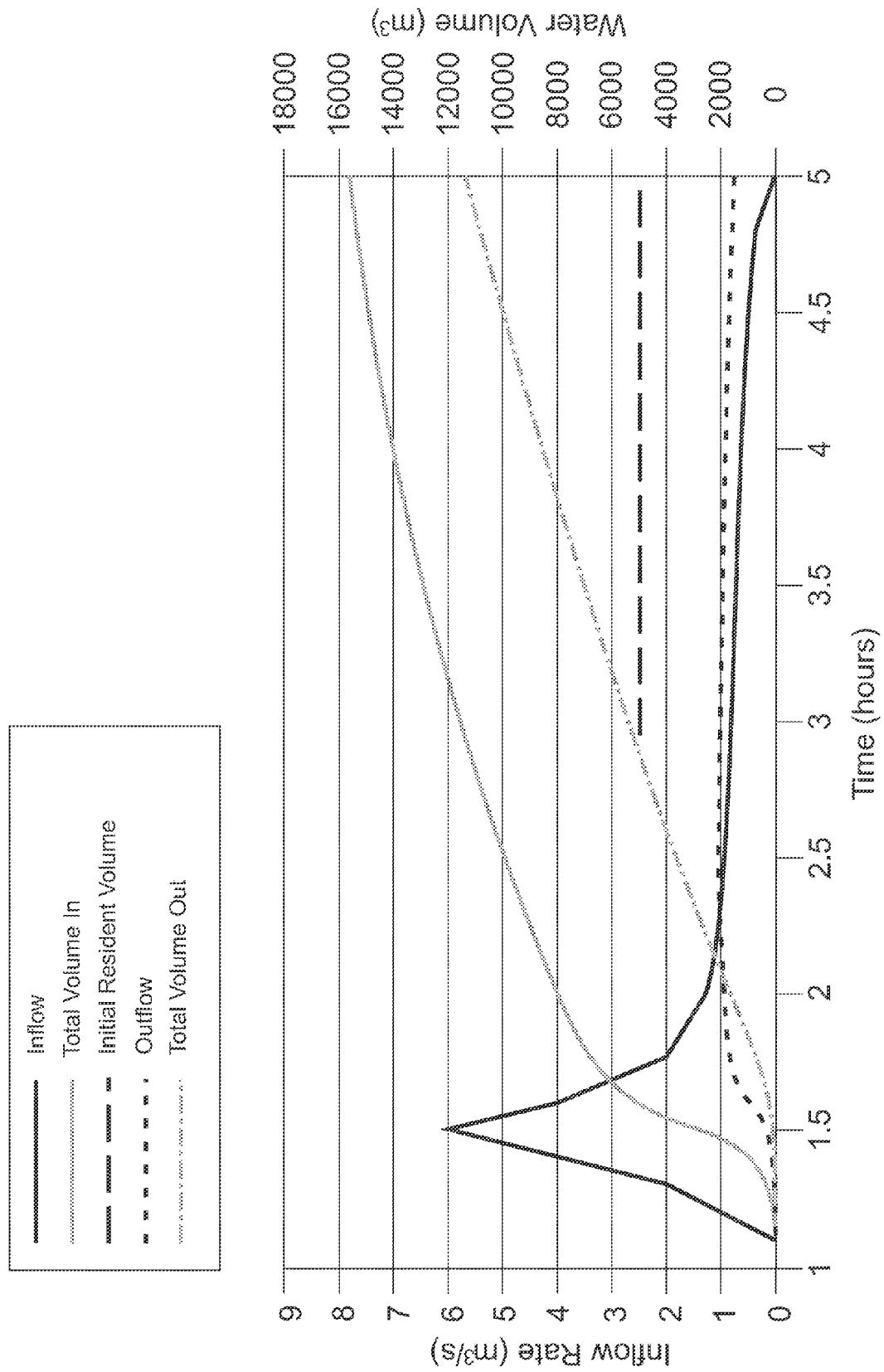
FIG. 1B is a graphical representation of the stormwater event of FIG. 1A in a traditional stormwater pond illustrating inflow, outflow

As shown in FIG. 1B, a simulated outflow hydrograph illustrates a volumetric attenuation effect of the stormwater pond where the outflow does not exceed about 1 m$^3$/s even though the inflow rate reaches a peak of about 6 m$^3$/s. This significant benefit, with regard to attenuating the flow delivered to downstream storm trunk pipes, is the primary reason that stormwater ponds are constructed today.

FIG. 1B also illustrates the cumulative total volume of water that has entered and the cumulative total volume of water that has exited the stormwater pond. At any given time, the difference between these volumes represents the storage volume above the permanent water level or resident volume that is temporarily impounded in the stormwater pond.

In some locations such as in Alberta, Canada, typical design criterion calls for a maximum active variation of 2.0 m in the water surface elevation in response to a one-in-five year 24-hour storm event. The difference between the pond volume at rest and the pond volume under maximum design conditions is termed the "maximum active volume". The maximum active volume of water stored in the pond raises the water surface elevation in the conventional pond by approximately 1.5 m, thus the inflow hydrograph shown in FIG. 1B represents a significant and near maximum inflow event. The total volume of water under the inflow hydrograph is more than three times greater than the resident volume of water in the pond prior to the storm event.

Recent advancements in computer modeling technologies have permitted the development and use of multidimensional computational fluid dynamics (CFD) software in exploratory studies of fluid systems behaviour. Such analysis software enables an analyst skilled in the art to conduct more cost effective exploratory studies of stormwater pond behaviour where the investigations are not constrained by size, geometrical or other input variable complexity, and is typically less constrained by time than would be the case if the more traditional fluid systems analysis tools, such as the construction, manipulation and observation of scale models, were utilized. The modeling results reported herein may be replicated effectively either through the use of three dimensional or two dimensional CFD software packages where a solution for some form of the Navier-Stokes hydrodynamic equations and for some form of the advection-diffusion equations are computed.

The specific results reported herein were generated using two dimensional CFD analysis tools that solved the depth averaged Navier-Stokes equations, also known as the St. Venant equations, and the depth averaged advection diffusion equation.

Figure 2A:
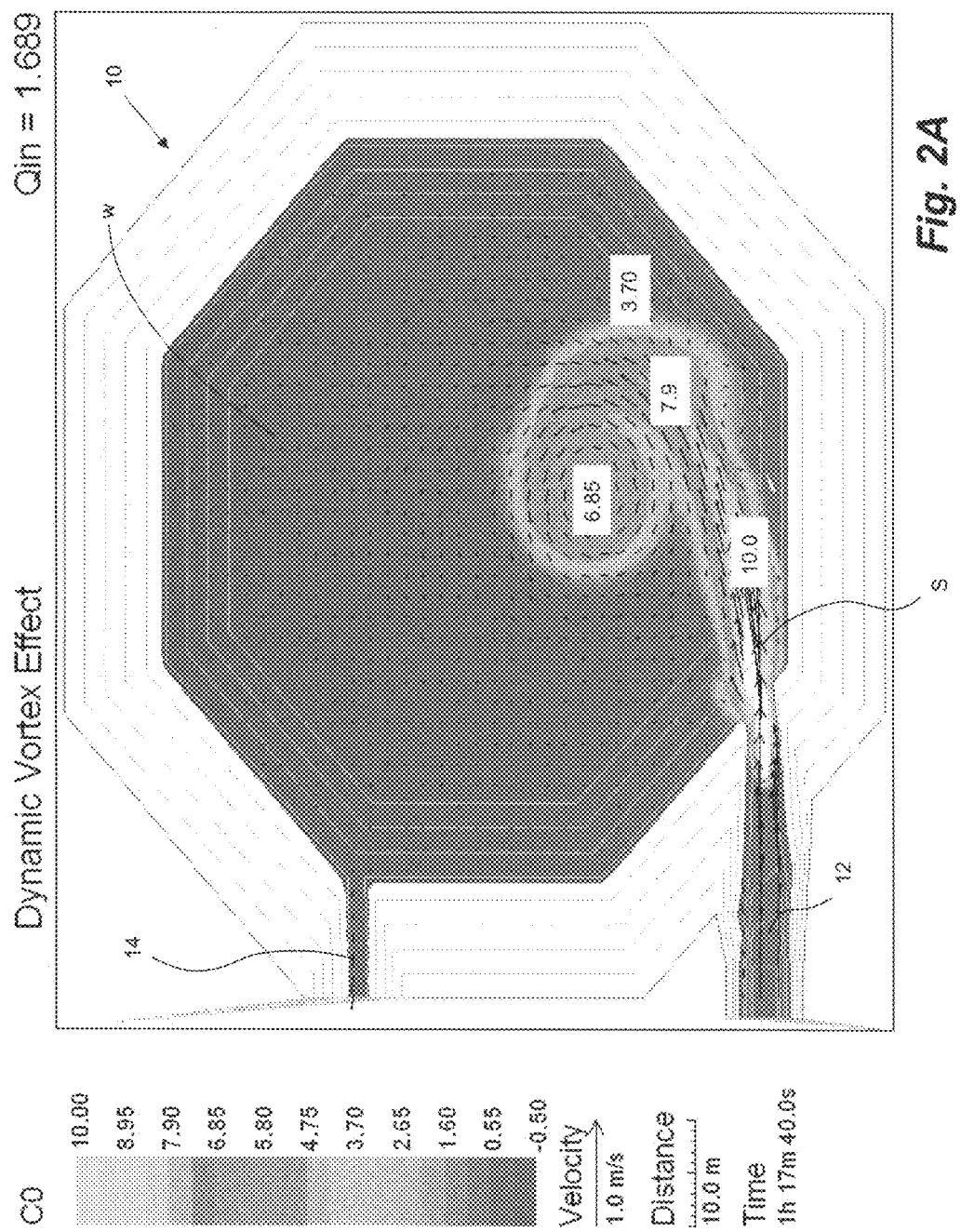
FIGS. 2A-2E are plan views of modeled, prior art upstream ponds illustrating the developing flow patterns generated in response to a stormwater runoff event producing large volumes and high inflow rates according to FIG. 1, which are within the design expectations for the pond, the runoff entering an initially quiescent pond, displacing and initiating motion in the clarified water therein, raising the water level and inducing water to flow over a spillway therefrom, more particularly
Figure 2B:
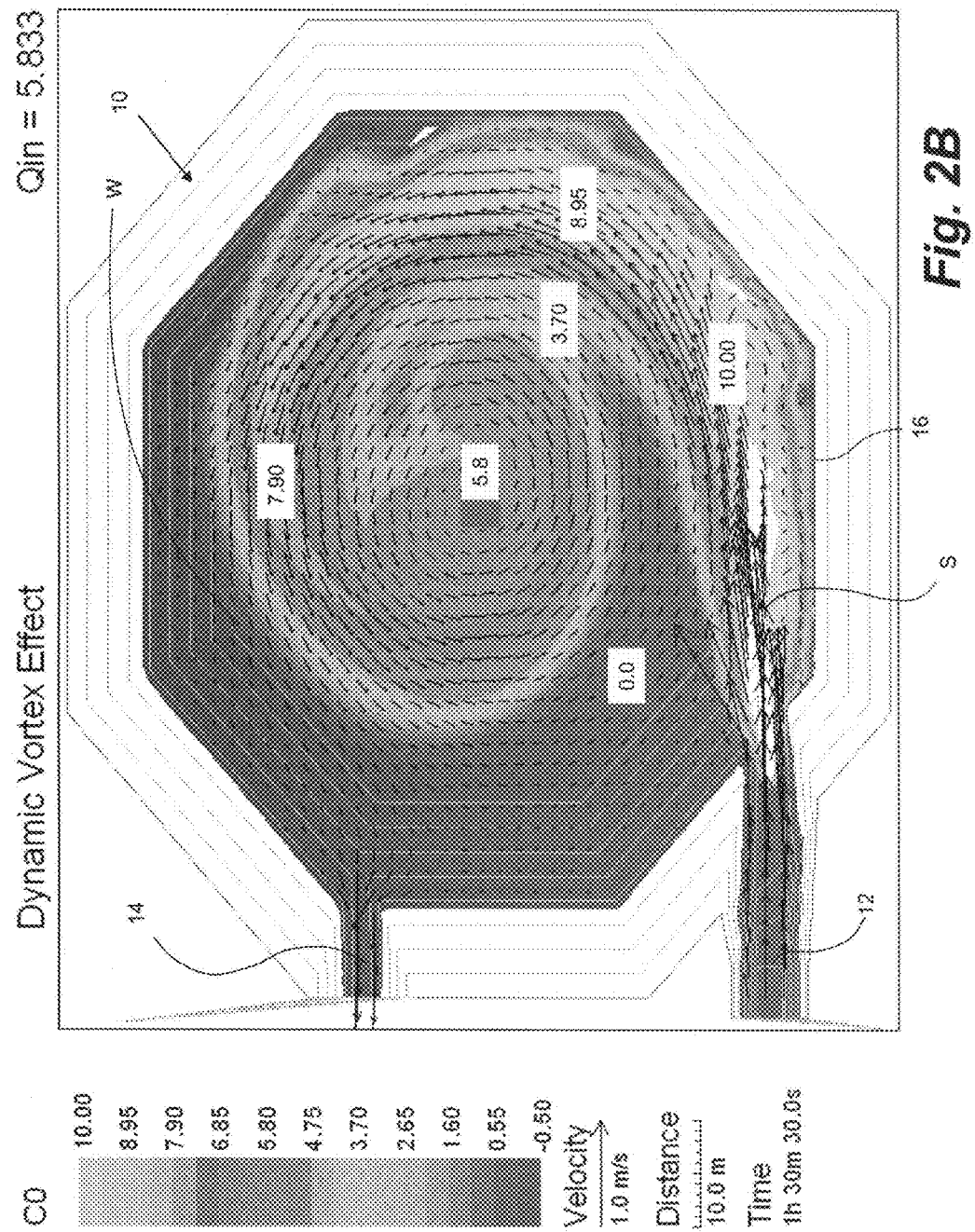
Figure 2C:
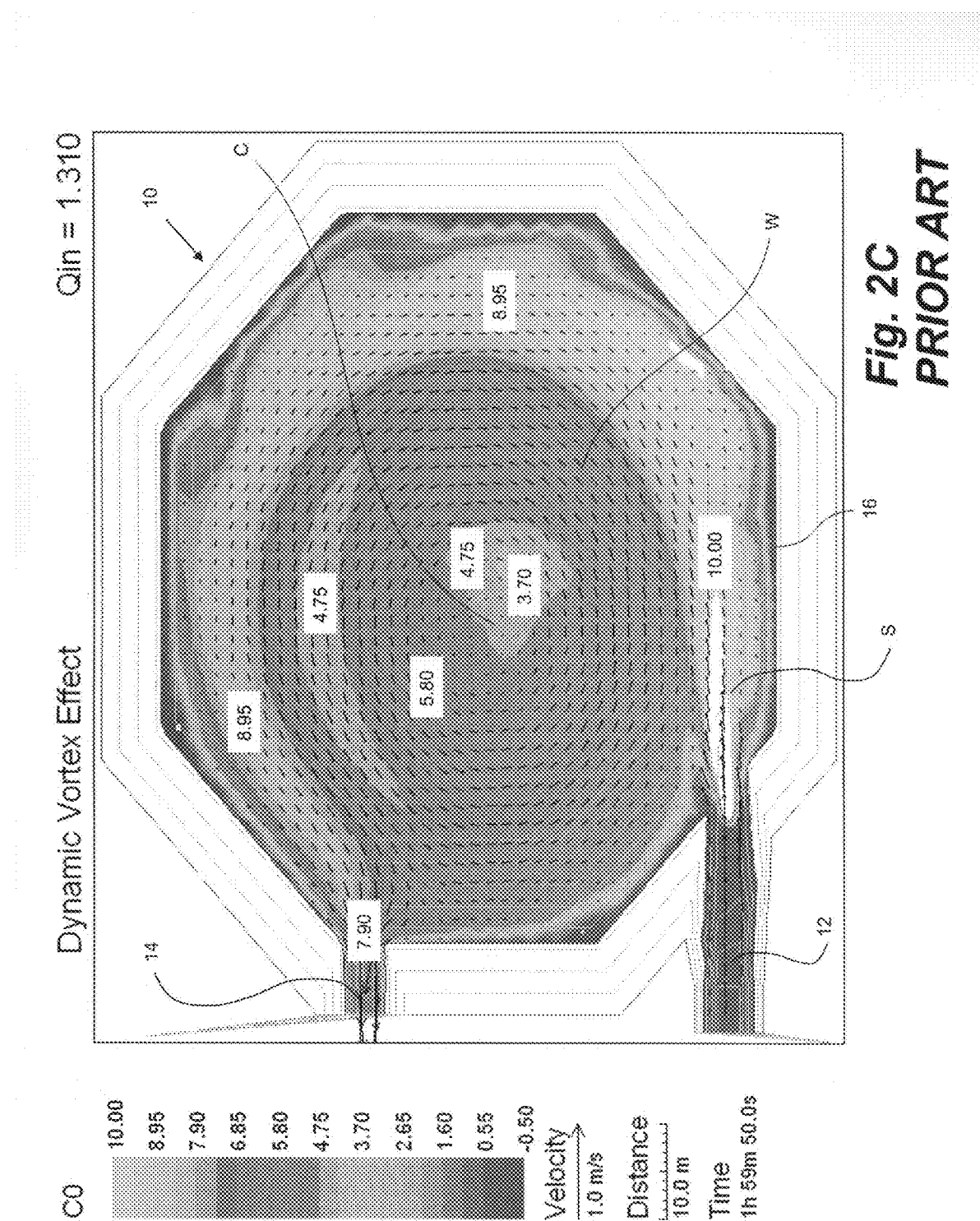

As shown in FIGS. 2A-2C, the pond 10 receives the large influx of stormwater S according to the stormwater event shown in FIG. 1A. Having reference to FIG. 2A, the sediment or contaminant-laden stormwater S is directed initially in a tight leading edge vortex from an inlet 12 to water W stored within the pond 10. As stormwater S enters the pond 10, the water W in the pond 10 overflows a spillway 14, connecting the upstream pond 10 to downstream aspects of a watershed.

As shown in FIG. 2B, the contaminant-laden stormwater S is directed from the tight leading edge vortex outward toward a periphery 16 of the pond 10.

Thus, as shown in FIG. 2C, the overflow of water W from the pond 10 creates a flow path for the contaminant-laden stormwater S which essentially by-passes largely stagnant central zones C of the pond 10. The prior art incorrectly assumes the central zones C to be effectively utilized within the pond 10 for settling of sediment or removal of other contaminants therein however the model illustrates that this is not the case. The contaminant-laden stormwater S is directed into and out of the pond 10 without an appropriate opportunity to be effectively clarified within all portions of the pond 10 and the contaminants are largely thereafter carried downstream from the pond 10. Such downstream conveyance of contaminants, including sediment, may be detrimental to other downstream components and/or the receiving watershed.

Embodiments of the Invention

As one of skill in the art would appreciate, embodiments of the invention may be incorporated into conventional pond configurations, or alternatively, can be incorporated into other known configurations, such as wetlands. Thus, the term "pond" used herein more broadly applies to a variety of configurations as are known in the art.

Figure 3:
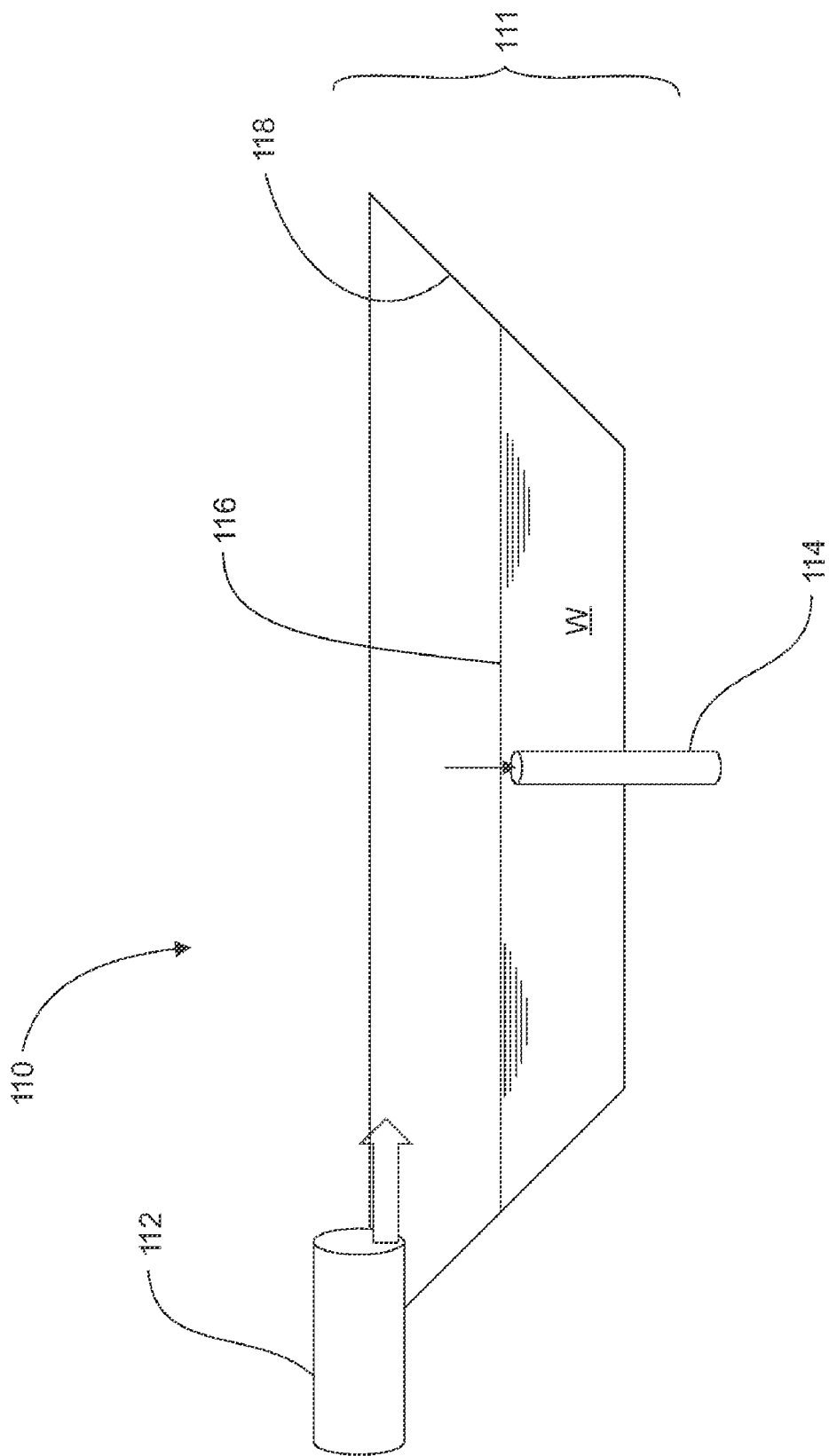
FIG. 3 is a sectional elevation view of a pond according to an embodiment of the invention having a tangential inlet at a periphery of the pond and a central outlet.

As shown in FIG. 3, a pond 110, which may be a forebay or upstream stormwater pond, according to an embodiment of the invention, comprises a basin 111 having a substantially tangential inlet 112, a substantially central outlet 114 and a resident volume 116 which contains at least a minimum volume of stored water therein. Generally sides 118 of the pond 110 are gently sloped. The horizontal (diameter) to vertical (depth of resident water 116) aspect ratio of the pond 110 is typically in the order of greater than 10:1. The inlet 112 may discharge stormwater S into the pond 110 at, above or below the surface of the water in the pond 110.

When the inlet 112 is not directly tangential to the pond 110, the inflow of stormwater S entering the inlet 112 may be deflected near the entry point, such as by a substantially tangential feature or component 120 located in the pond 110, to direct the inflow tangential to a periphery 126 (FIG. 4) of the stored volume of water 116 in the pond 110. As shown in FIG. 4, even when stormwater S is directed substantially tangential at the inlet 112, substantially tangential components 120 positioned adjacent the inlet 112 and/or elsewhere in the pond 110 assist in developing and maintaining the desired flow path as described herein. Water exits the pond from the central outlet 114.

The pond 110, which stores the at least a minimum storage or resident volume of water 116 therein, is generally quiescent prior to the stormwater event and has a large rotational inertia. In other words, a significant amount of energy, such as is generated by rapidly inflowing stormwater S during a stormwater event, must be imparted to the resident volume 116 to cause the largely quiescent resident volume of water 116 to move within the pond 110. Further, the minimum resident volume 116 is typically substantially clarified. The pond 110 is designed to have a storage capability several times the minimum resident water volume 116 when the water elevation has reached its maximum.

As shown in FIGS. 1A and 1B, significant stormwater runoff events typically result in a peak inflow rate to the pond sometime during the event. The peak or maximum inflow rate is typically briefly maintained at a value many times greater than the average inflow rate.

Having reference to FIGS. 5A-5C and FIG. 6, stormwater runoff events, according to FIG. 1A and FIG. 1B respectively, were modeled in a pond 110 according to embodiments of the invention. FIGS. 5A-5C are shown at the same time intervals as for prior art FIGS. 2A-2C. FIG. 6 was modeled in a pond 110 according to FIG. 4 having a structure 120, such as a berm, positioned in the pond 110 for assisting in developing flow patterns in the pond. FIG. 6 is shown at the same time interval as for prior art FIG. 2E. FIGS. 5A-5C were modeled in a pond 110 without a berm 120.

The contaminant-laden stormwater S enters the upstream pond 110 through the tangential inlet 112. The stormwater S encounters the quiescent, resident volume of water 116 stored in the pond 110. Initially, as shown in FIG. 5A, the contaminant-laden inflow of stormwater S, displaces and begins to overcome the large rotational inertia of the resident volume of water 116, initiating motion therein. The initial motion is seen to be in the form of a tight leading edge vortex flow pattern 122 that rapidly expands in size toward the central outlet 114.

Thereafter and over time, as shown in FIG. 5B, the leading edge vortex flow pattern 122 of the contaminant-laden stormwater S overcomes the rotational inertia of the initially non-rotating flow of the resident water 116 and extends the flow pattern to an expanding spiral flow path 124 toward the periphery 126 of the pond 110.

Thereafter, as shown in FIG. 5C, a fully developed spiral flow pattern 128, being an open spiral flow path which, at its greatest extent, flows substantially about the entire periphery 126 of the pond 110, displaces at least a portion of the stored, resident volume 116, as a substantially clarified stream, thereahead to the central outlet 114. Unlike the fully developed flow pattern in the prior art (FIG. 2C), the pond 110 results in water slowly spiraling inwards toward the central outlet 114, extending the hydraulic retention time of the contaminant-laden stormwater S within the pond 110. The slow, open-spiral flow path 128 encourages the removal of at least a portion of sediment and other contaminants therein. Largely clarified water is discharged from the central outlet 114.

Typically, the central outlet 114 is positioned within the pond 110 such that, following the conclusion of the stormwater event and the clarification process, the pond volume will return to the minimum resident volume 116 and will dissipate substantially any rotational energy therefrom, returning to a largely quiescent resident volume 116.

Figure 2D:
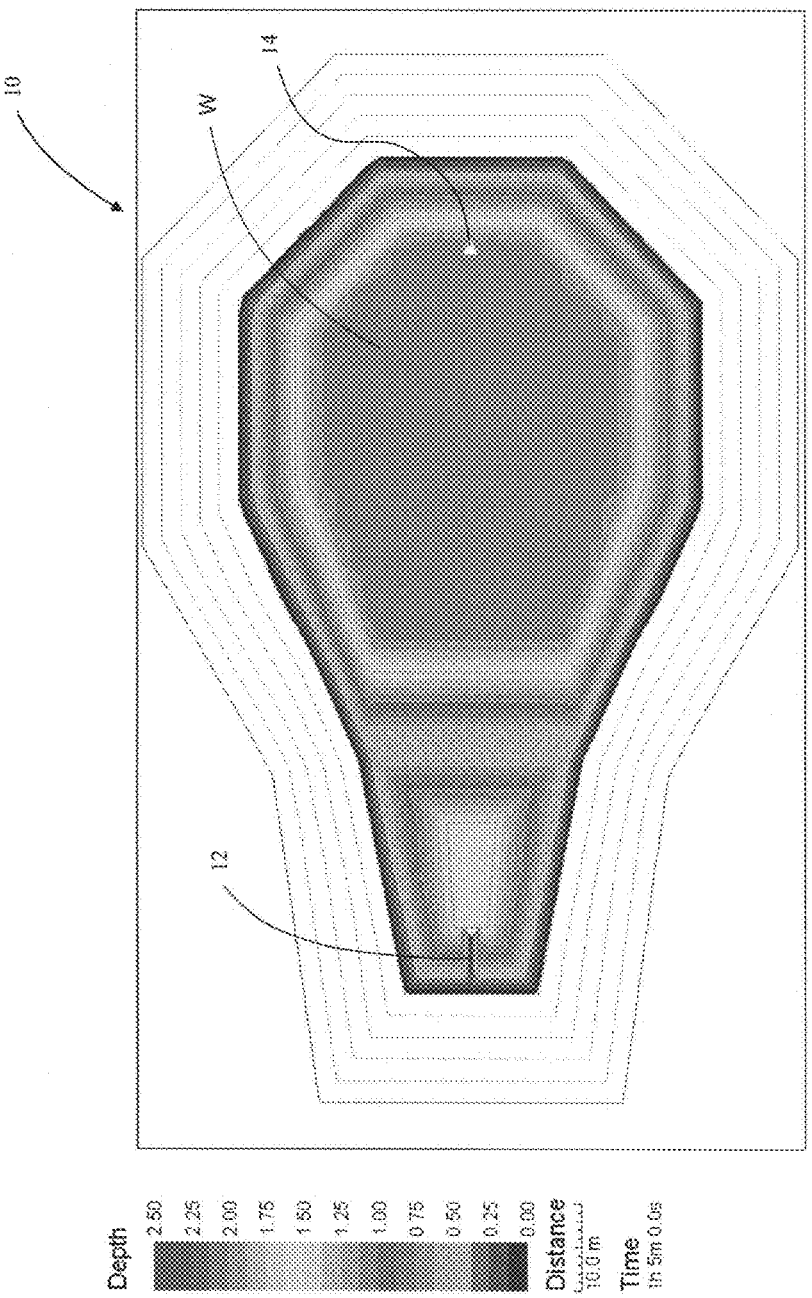
Figure 2E:
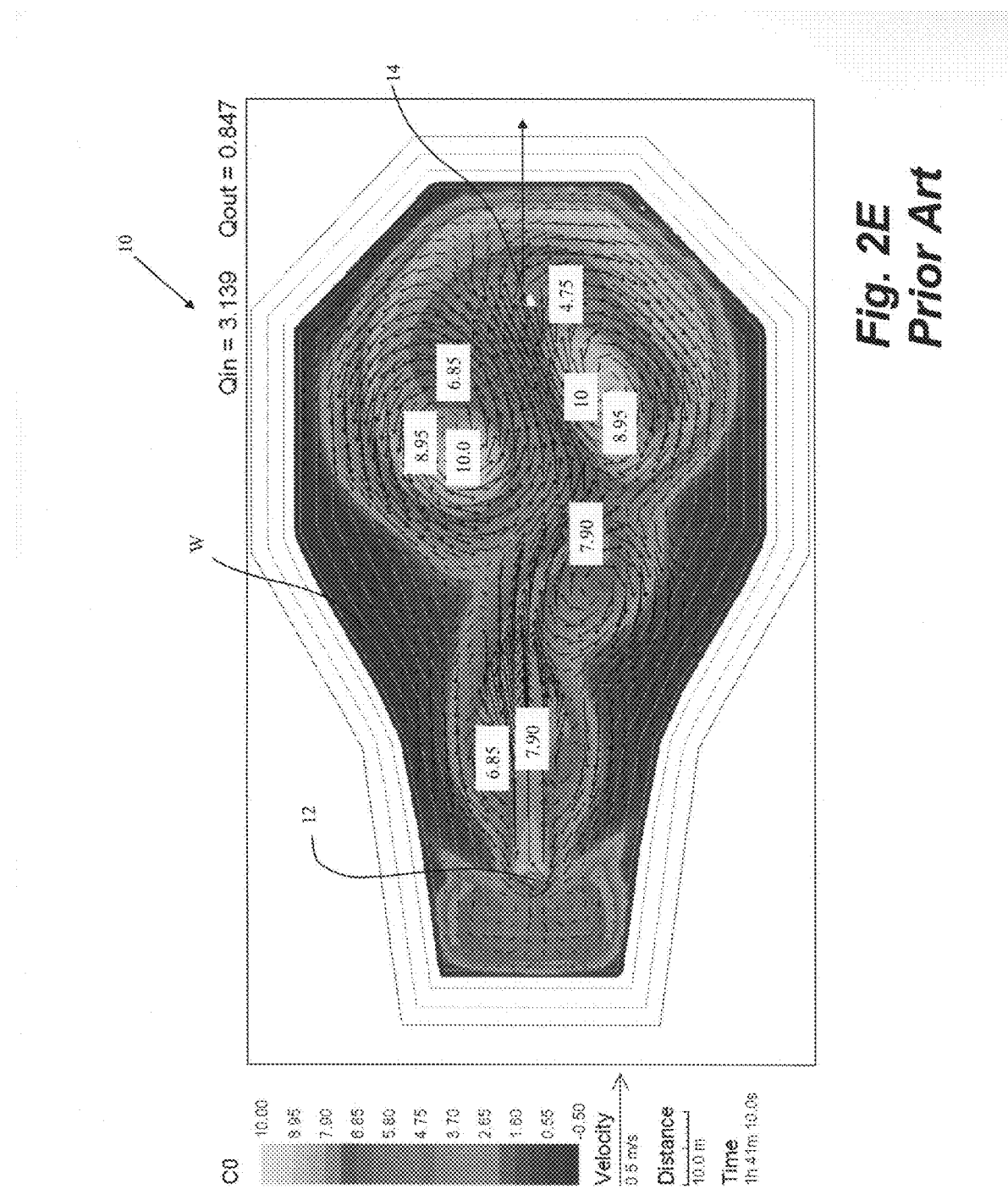
Figure 7:
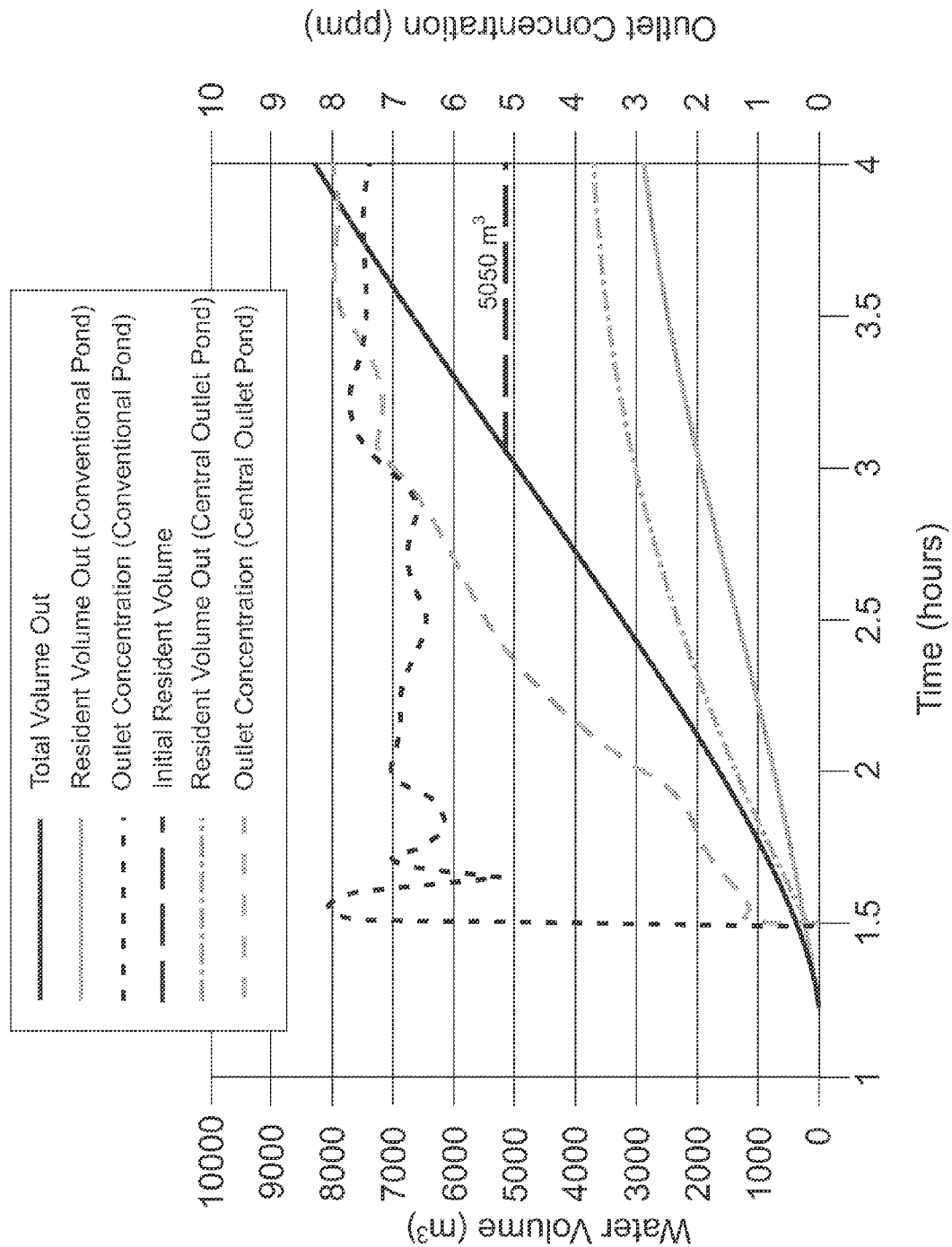
FIG. 7 is a graphical comparison between a conventional stormwater pond as shown in FIG. 2D and a pond according to FIG. 4, the comparison being of the volumes of resident water discharged and the contaminant concentrations in the ponds at the outlets, over time.

FIG. 7 provides a graphical comparison of the prior art pond 10 such as shown in FIGS. 2D and 2E, with a pond 110 according to an embodiment of the invention, such as was modeled in FIGS. 4 and 6. The total volume of water discharged from the ponds 10,110 is the same. The graph further compares the amount of largely clarified, resident water 116 which is discharged from the ponds 10,110 in advance of the discharge of stormwater runoff, as well as the concentration of contaminants in the water at the outlet 14,114. Values for the resident volume 116 discharged at the outlets 14, 114 were computed based on the dilution of inflowing water that entered the ponds 10,110 at a constant concentration of contaminants of 10 ppm. For example, if the average outlet contaminant concentration was 7.0 ppm, from a model time of 1.6 hours onward, 30% of the water discharged after a model time of 1.6 hours was resident prior to the storm event. The simulated fluctuation in outlet concentration results from eddies of varying concentration flowing past the outlet 14,114.

Theoretically, for an ideal pond scenario having perfect plug flow, the volume of resident water 116 discharged in advance of the discharge of stormwater entering the pond would follow the total volume of water discharged until about 3 hours when the total volume of resident water 116 has been completely discharged from the pond. The outlet contaminant concentration would be zero until all the resident water 116 is discharged, reflecting the clarity of the resident water 116. Following discharge of all of the resident water, the outlet concentration would change to a constant value of 10 ppm which is the concentration of the inflowing stormwater used in the simulation.

The more prone a pond is to short-circuiting the pond volume, such as passing substantially directly from the inlet to the outlet, the earlier the outlet contaminant concentration rises and to a greater degree.

As seen in FIG. 7, the prior art pond 10 is prone to short-circuiting as it exhibits an early and large increase in simulated outlet contaminant concentration. Further, the resident volume discharged is significantly below the total volume discharged indicating that stormwater is moving directly to the outlet 14 without time to achieve removal of contaminants and is not preferentially discharging already clarified resident water from the pond 10 in advance of the stormwater to allow more time for the contaminants in the stormwater to be removed. As a result, less than 50% of the resident water volume was flushed from the pond 10 at approximately four hours.

The contaminant concentration at the outlet 114 of a pond 110 according to an embodiment of the invention only gradually increases as resident water 116 is discharged ahead of the inflowing stormwater S. Newly inflowing stormwater S is caused to flow in the fully developed spiral flow path around the pond periphery 126 resulting in an increased residence time and greater contaminant removal therefrom. When comparing the resident volume of water 116 discharged in FIG. 7, it is not until a model time of almost two hours that the volume of water discharged from the pond 110, begins to deviate significantly from the perfect plug flow. For the first hour that each pond 10,110 is responding to the storm event, which corresponds to approximate model times of between 1.5 and 2.5 hours, the pond 110 according to an embodiment of the invention discharges from the outlet 14,114 at significantly lower concentrations than the prior art pond 10. After a model time of approximately 3 hours, the pond 110 according to an embodiment of the invention discharges at a slightly higher concentration than the conventional pond 10.

It is apparent from the results shown in FIG. 7 that a pond 110 according to an embodiment of the invention, is more resistant to short-circuiting than a prior art pond 10. In fact, from the moment stormwater S begins entering each pond 10,110, it takes about 2.5 hours for the prior art pond 10 to discharge 50% of the resident water volume, whereas in pond 110, flushing the same resident water volume 116 takes only about 1.5 hours. As a result, the pond 110 according to an embodiment of the invention delivers more of the clarified resident water to the outlet 114 before less clarified stormwater S appears for discharge. This enables better overall stormwater treatment opportunities by providing generally longer stormwater retention given the same stormpond footprint area. Furthermore, the fully developed spiral flow path 128 is resistant to dead zone formation, with the exception of local areas, such as in the wake of islands and other internal structures, the entire pond volume being generally flushed from the periphery 126 toward the central outlet 114.

Over a design period, typically in the order of about 20 to 30 years, the deposition of fine sediment within the pond 110 results in a compression of sediment previously deposited in the pond 110. The compressive effect creates a higher bulk density, the compressed sediment becoming excavatable rather than slurry-like over time, which reduces the cost of removal and transport. Typically, sediment compression may be up to 40% or more solids content. The large volume of sediment is accumulated with reduced risk of release during major storm events through embodiments of the invention.

Applicant believes that strategic placement of features, such as a surface flow-resistance element, including aquatic or riparian vegetation, geotextile curtain walls, berms or other geometric or surface structures 120, substantially adjacent the tangentially-oriented inlet 112 of the pond 110 and also within the pond 110, may be beneficial. Such features 120 assist in incorporating the clarified, stored resident water volume 116 into the leading edge vortex pattern 122 and result in the fully developed spiral flow path 128. The incorporation of the clarified water with the expanding centrally-focused, leading edge vortex 122 preferentially allows clarified water to exit the pond 110 via the central outlet 114. This permits the fully developed spiral flow path 128 to develop within the pond 110 and additional contaminant-laden stormwater S inflow entering the pond 110 to be directed thereafter. Once established, the structures 120 assist in maintaining the spiral flow path 128.

In another embodiment, Applicant has recognized that a spiral flow path 128 as described herein may also be created using a central inlet and a peripheral discharge (not shown); however, geometric features 120 such as berms, use of vegetation and, optionally, use of a circulation pump, are likely to be required in order to develop and sustain the spiral flow path 128.

Applicant believes that one can take advantage of naturally occurring Coriolis rotational forces generated by the earth's rotation to reinforce the desired spiral flow path 128. The rotational direction of the rotational forces within the pond 110 generally depend upon the hemispherical location of the pond 110, as well as the location of the inlet 112 and outlet 114 in the pond 110. Embodiments where the pond 110 has a peripheral inlet 112 and a generally central outlet 114 should be directed to have rotation in a counterclockwise direction in the northern hemisphere and a clockwise direction in the southern hemisphere.

In embodiments where a central inlet and a peripheral outlet may be used, the opposite rotational direction is appropriate.

Figure 8:
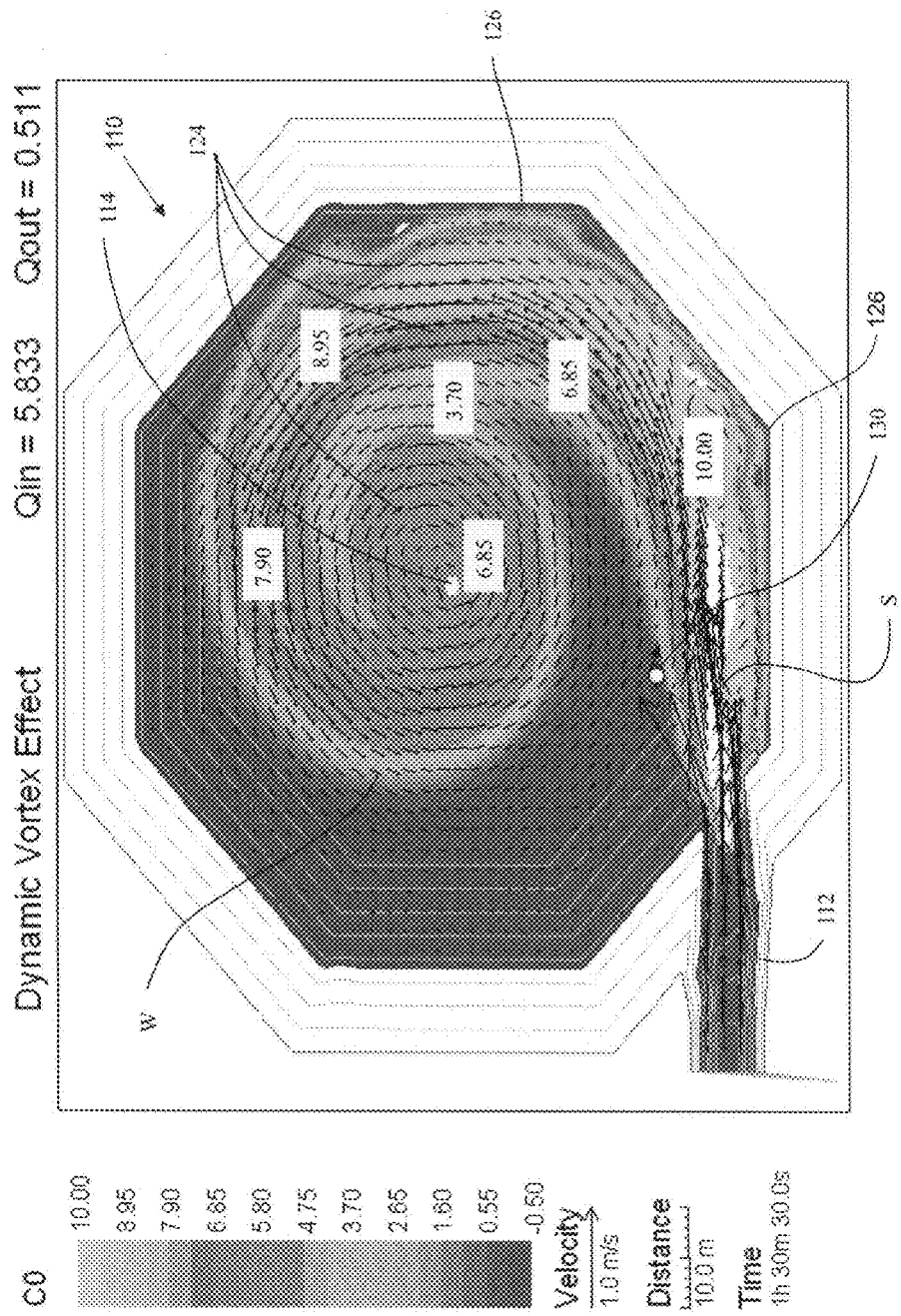
FIG. 8 is a plan view of the pond of FIG. 5B, illustrating the positioning of a small, conventional circulation pump in the pond.

In embodiments of the invention, the full spiral flow path 128 develops passively over the time required to receive the stormwater runoff event. However as shown in FIG. 8, and in an embodiment of the invention, a small, but continuously operating circulation pump 130 placed in the pond 110, and discharging substantially tangential to the pond periphery 126 and in the same direction as the tangential inlet 112, may act to maintain a minimal rotational energy in the pond 110. Alternatively, the pump 130 may be only intermittently operating.

The minimal rotational energy imparted by the pump 130 to the resident water volume 116 aids in more quickly establishing the fully developed spiral flow path 128 upon receiving the stormwater runoff S without significantly decreasing the increased residence time of the stormwater inflow S within the pond 110. In embodiments of the invention, the pump 130 would be positioned closer to the periphery 126 of the pond 110 than to the central outlet 114.

As shown in FIG. 3, the central outlet 114 may be a discharge pipe, which extends upwardly from the bottom 128 of the pond 110.

Figure 9:
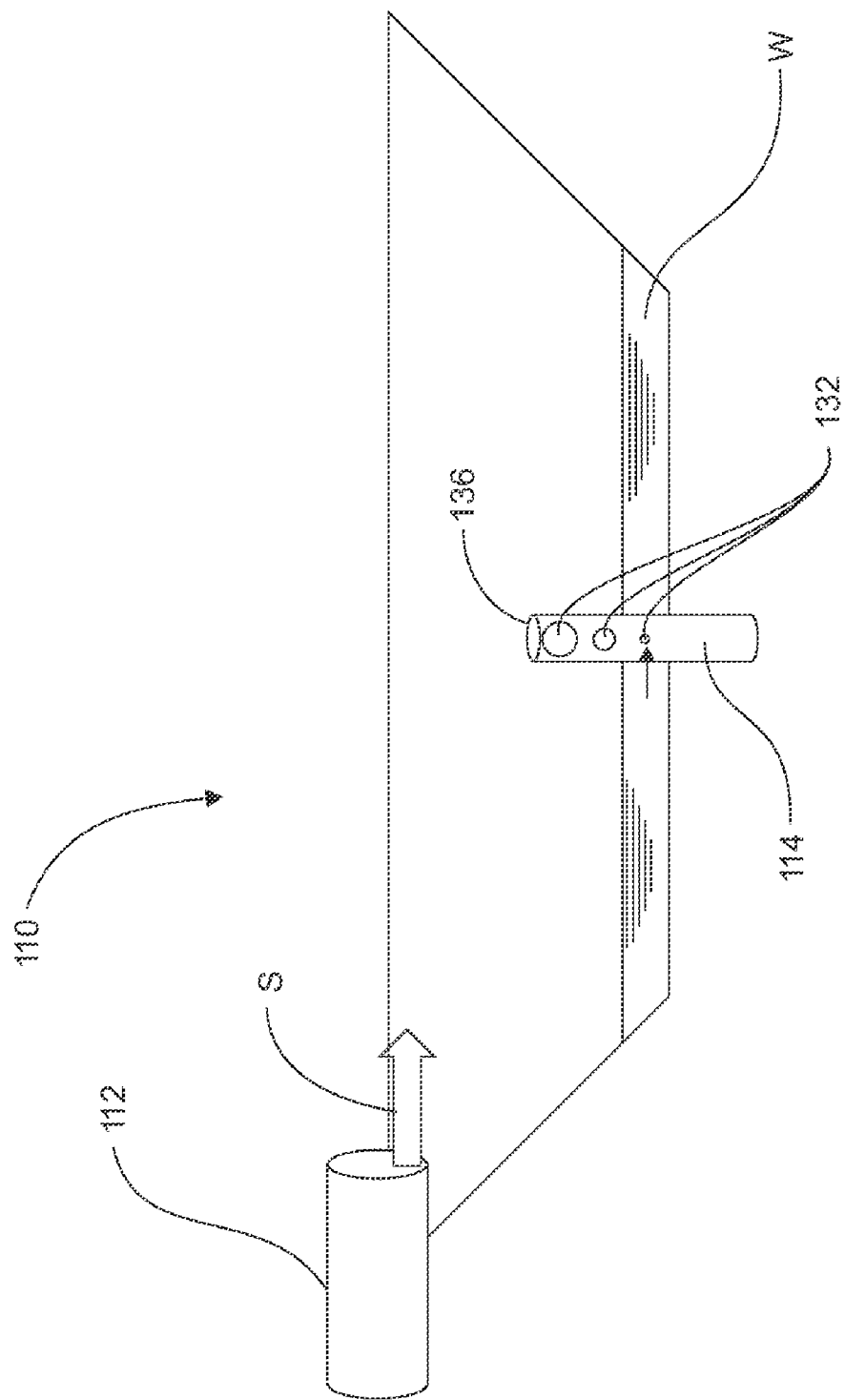
FIG. 9 is a sectional view according to FIG. 3, illustrating staged, sized discharge ports in the central outlet for varying outflows of stormwater from the pond in a controlled manner based upon the water surface elevation in the pond.

In another embodiment of the invention shown in FIG. 9, the discharge pipe can have a graduated discharge capacity wherein the higher the elevation above the resident volume 116, the faster the water can flow out of the pond 110. The discharge pipe 114 may have a plurality of graduated, sized orifices 132. Smaller orifices 132 are positioned lower on the pipe 114 for restricted discharge than larger orifices 132 which are adjacent a top 136 of the pipe 114 for less restricted discharge, minimizing overflowing of the pond 110.

Generally, the outlet 114 has a maximum rate of discharge less than a maximum rate of contaminated water inflow at the inlet 112.

Figure 10:
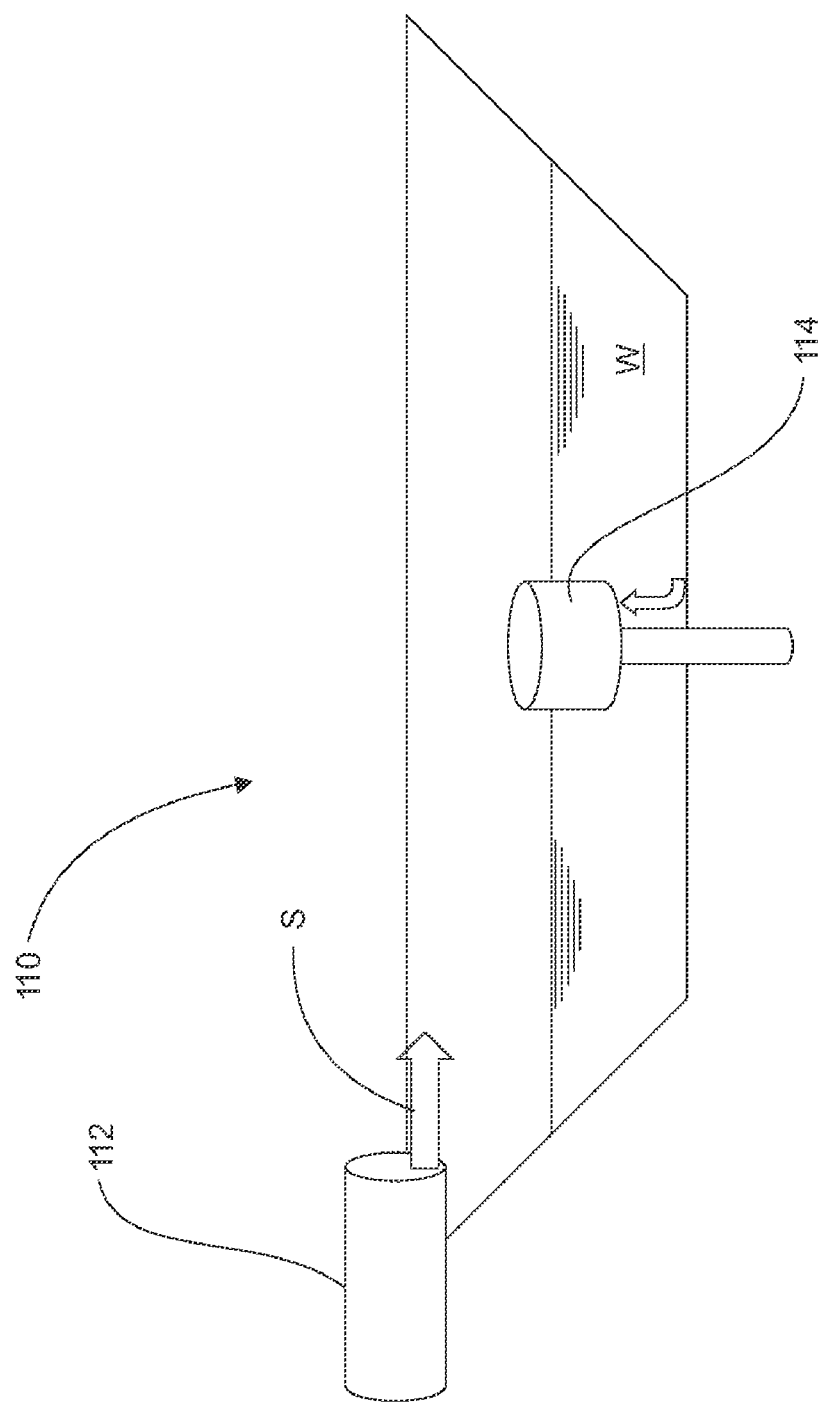
FIG. 10 is a sectional view according to FIG. 3, illustrating a discharge cover to aid in removal of clarified water from the pond without contamination from surface or sub-surface floating contaminants which do not and will not settle within the pond.
Figure 11:
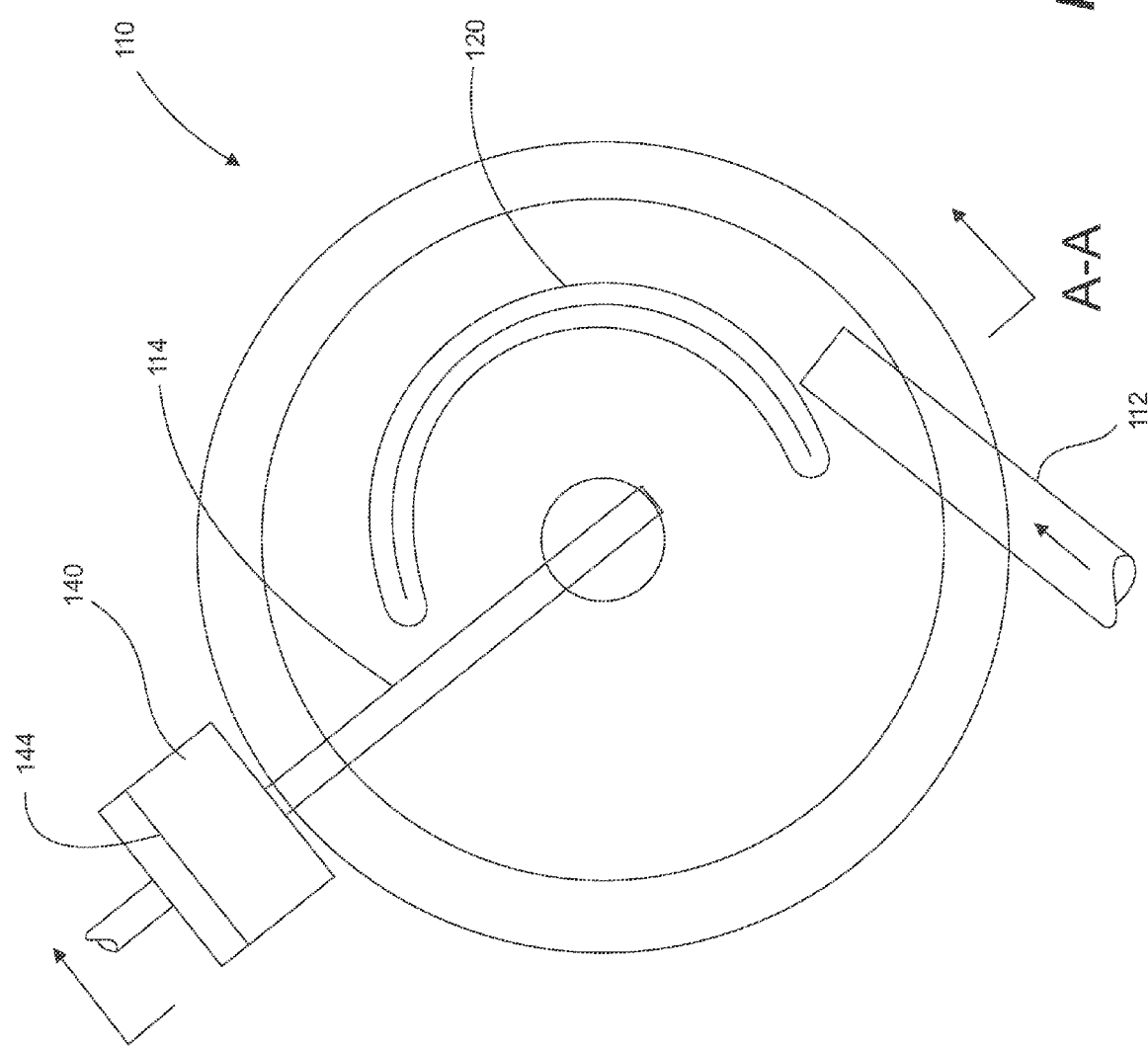
FIG. 11 is a plan view of a pond according to an embodiment of the invention illustrating a control structure positioned outside the pond for drawing water through the central outlet, the control structure aiding in maintaining the resident storage volume of water in the pond and for handling increases in volume as a result of stormwater events.
Figure 12:
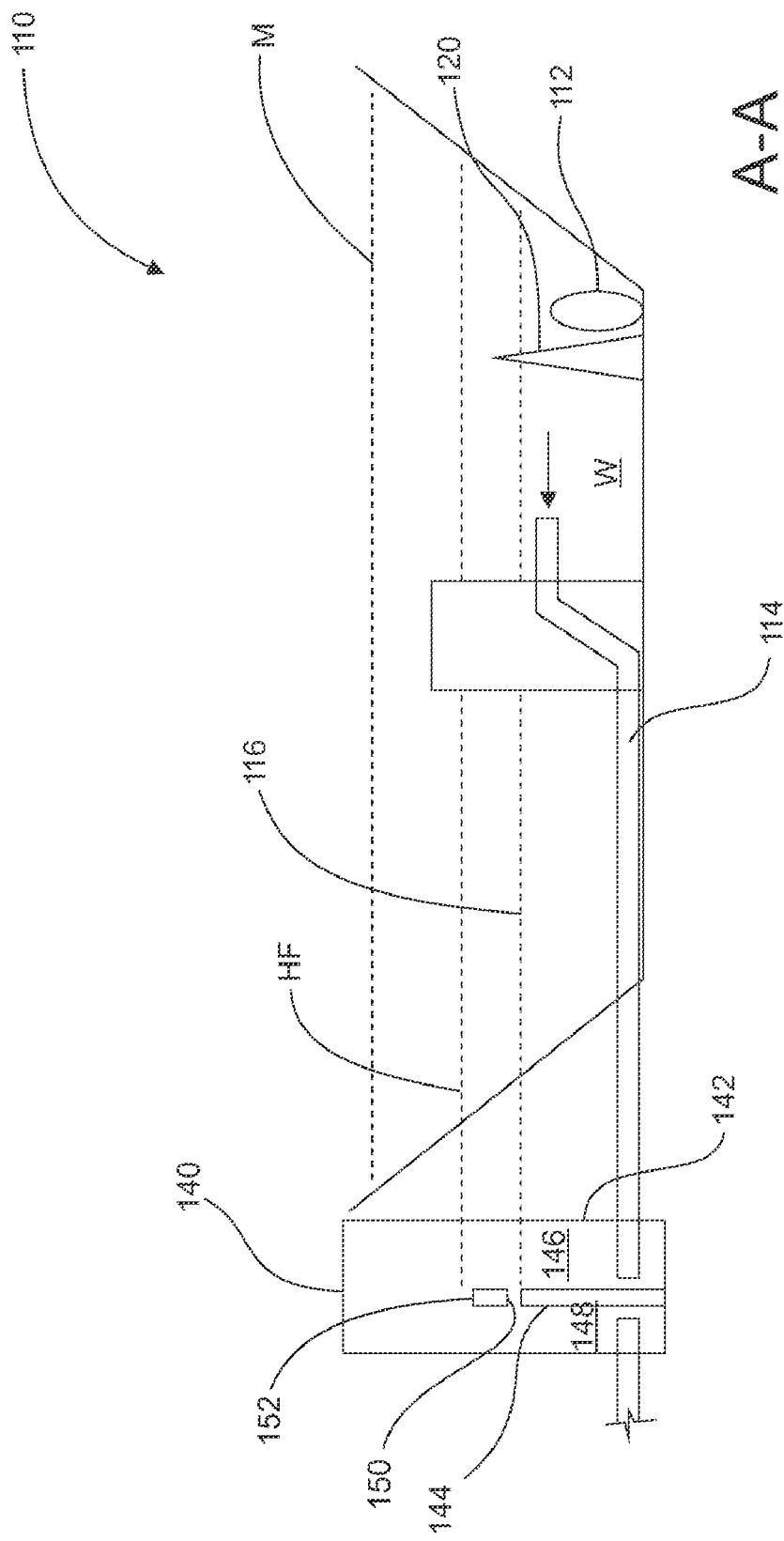
FIG. 12 is a sectional view according to FIG. 11 along A-A.

As shown in FIG. 10, and in another embodiment of the invention, the discharge pipe 114 may be a floating, subsurface discharge pipe to prevent floating debris, oil and the like, which float at or below the surface, from entering the discharge pipe 114. Thus, separation of contaminants from the pond 110 is largely density based.

In alternate embodiments, weirs, valves, gates and other flow control appurtenances or means may be used at the central outlet 114 to control the discharge of water W from the pond 110.

As shown in FIGS. 11-14, a control structure 140, housing the flow control means, is positioned external to the pond 110 to provide functional control of the water surface elevation in the pond 110 and to control the rate at which the water W leaves the pond 110. The control structure 140 is fluidly connected to the central discharge pipe 114. Further, the control structure 140, positioned external to the pond 110, provides easy access for maintenance of the structures and equipment located therein.

In an embodiment, the control structure 140 comprises a containment 142 having a weir 144 therein which separates the containment 142 into two chambers, a first chamber 146 which receives water W from the central outlet 114 and a second chamber 148 which receives water W from the first chamber 146 and thereafter discharges the water W from the control structure 140. The second chamber 148 is designed to be empty and therefore discharges substantially all of the water W received therefrom. The weir 144 at its maximum height provides an overflow which controls a high flow elevation HF in the pond 110. The weir 144 further comprises an orifice 150 spaced below a top 152 of the weir 144 which controls the resident storage volume of water 116 in the pond 110. Water W in the pond may rise to a maximum elevation M before exceeding an intended design volume as the rate of discharge from the pond 110 is substantially lower than a maximum inflow rate to the pond 110.

Figure 13:
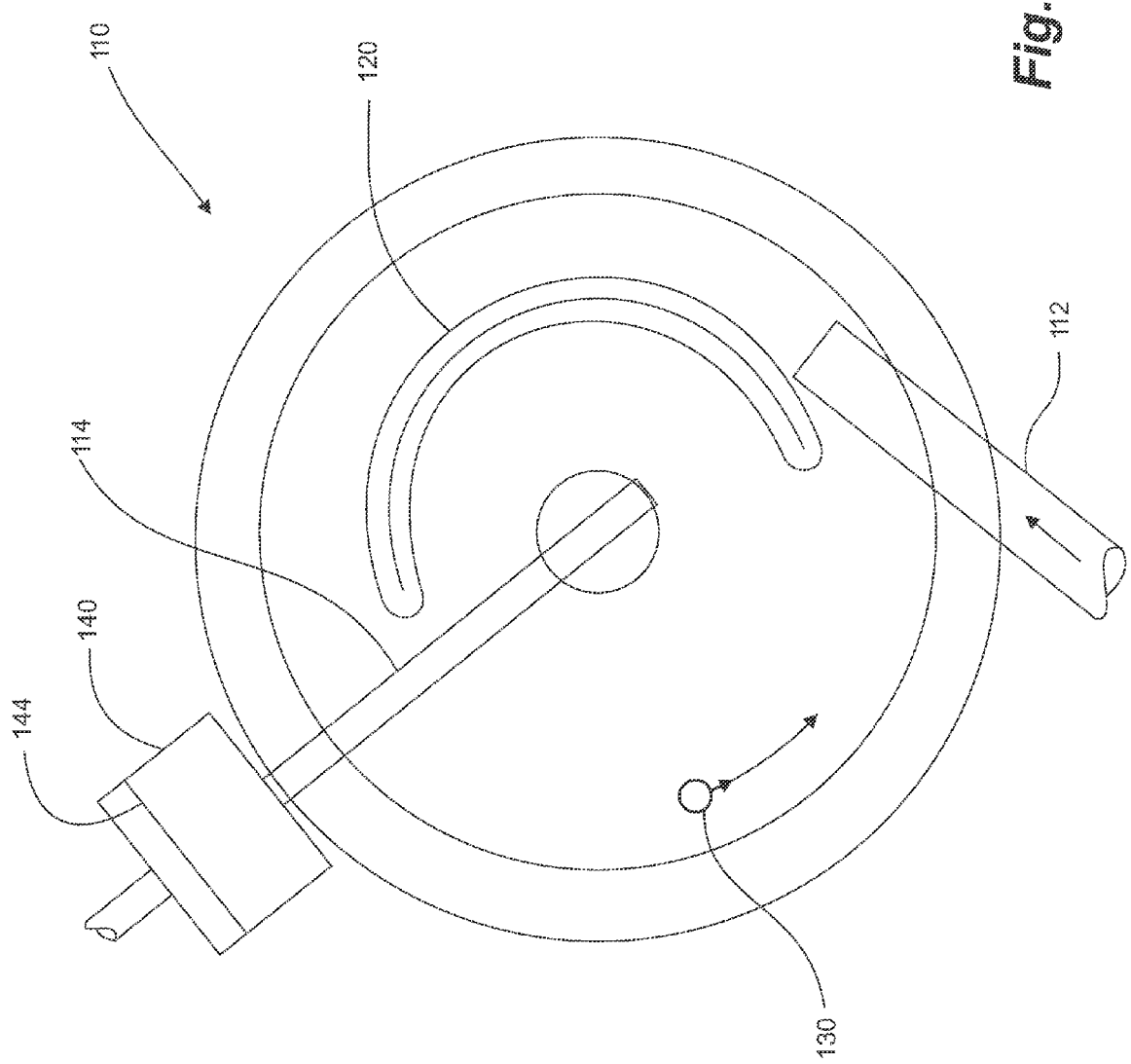
FIG. 13 is a plan view according to FIG. 11 illustrating placement of a conventional circulation or circulation/aeration pump within the pond volume.

As shown in FIG. 13 a conventional circulation pump 130 may be added within the pond volume to assist in overcoming the rotational inertia of the resident water volume 116, as described for FIG. 4. The conventional circulation pump 130 may also provide some local aeration, if the pump 130 selected is also an aeration pump.

Figure 14:
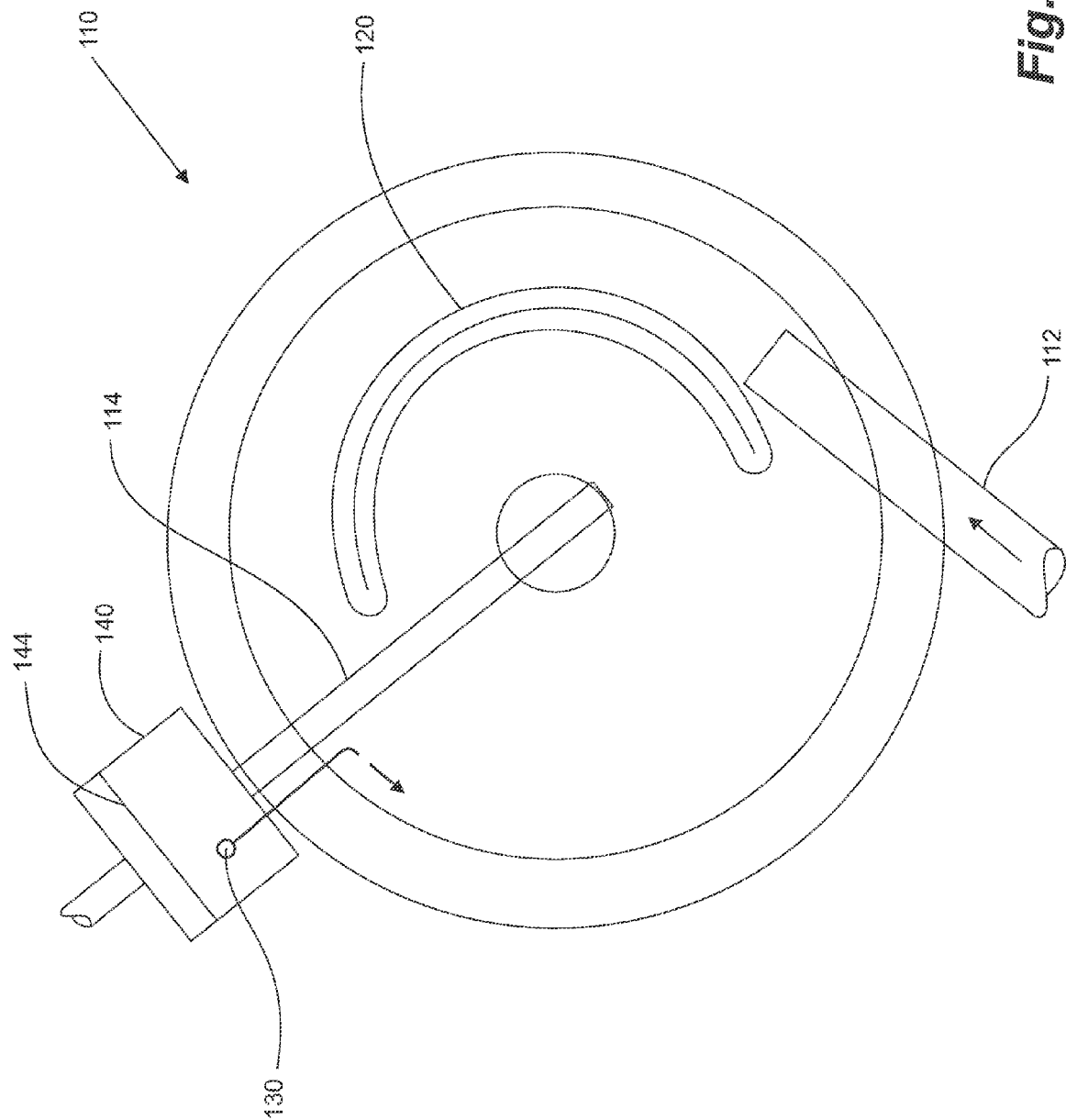
FIG. 14 is a plan view according to FIG. 11 illustrating placement of a conventional circulation pump or circulation/aeration pump within the control structure.

Having reference to FIG. 14 and in an embodiment of the invention, the conventional circulation pump 130, is positioned within the control structure 140. Water W is drawn from the centre of the pond 110 through the central outlet 114 and at least a portion thereof is pumped tangentially back into the pond 110, typically adjacent the periphery 126, to aid in overcoming the rotational inertia. Locating the pump 130 in the control structure 140 provides a number of advantages including easy access to the pump 130 for maintenance. Further, under conditions wherein the pond 110 is covered with ice, a circulation pump 130 positioned within the control structure 140 may be reasonably expected to remain operable whereas a pump 130 positioned in the pond 110 itself typically is not operated.

Advantageously, if the pump 130 selected is an aerating pump such as an AEROMIX® Submersible Aspirating Aerator pump (available from AEROMIX Systems Inc., Minneapolis, Minn., USA), drawing water W from the centre of the pond 110 and returning it to the periphery 126, even when there may be no inflow into the pond 110, allows the water W to be continually turned over and efficiently aerated.

The ability to continually turn over the water W further provides an efficient mechanism for the addition of chemicals or biologically active substances for treating substantially the entire volume of water in the pond 110. Chemicals or biologically active substances can be added directly to the pump 130 or can be added at the suction or discharge sides of the pump 130. Alternatively, a chemical dosing system (not shown) can be fluidly connected to either of the suction or discharge side of the pump 130 for dispensing chemical or biologically active substances automatically or in response to one or more measured parameters related to the pond volume or to the water therein.

Figure 15:
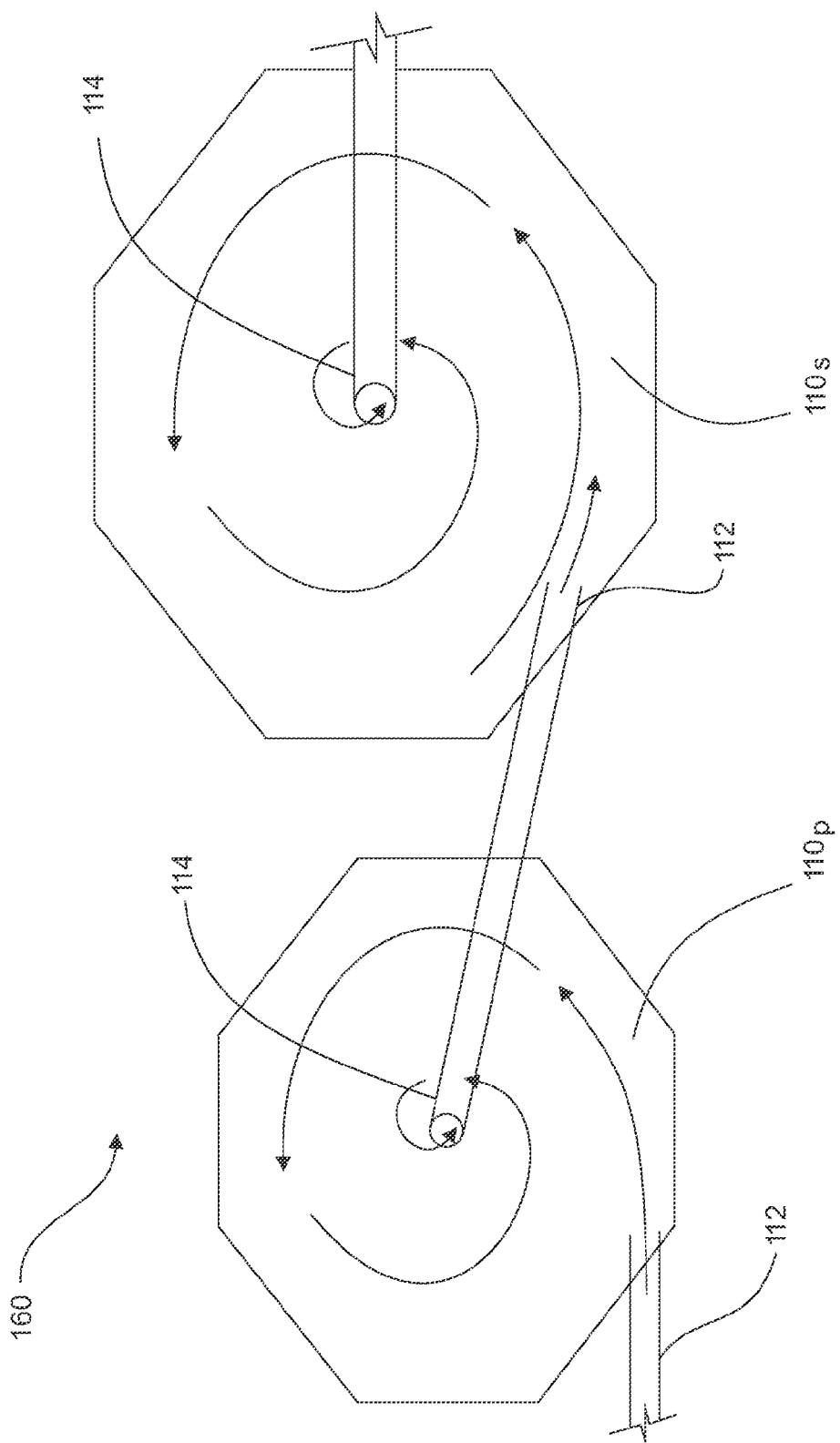
FIG. 15 is a plan view of a treatment train incorporating at least two ponds according to an embodiment of the invention, fluidly connected in series.
Figure 16:
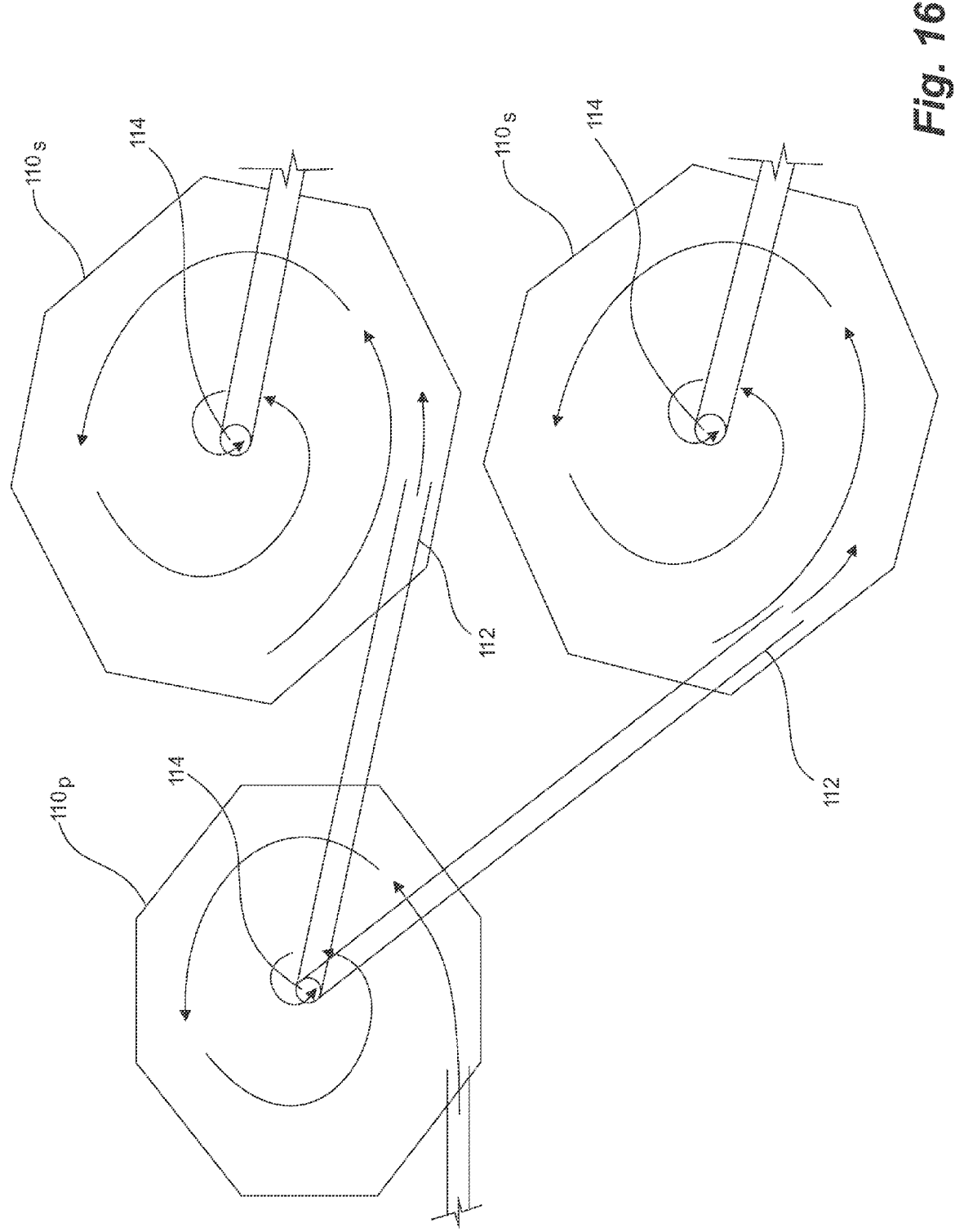
FIG. 16 is a plan view of a treatment train according to FIG. 15 wherein the ponds are fluidly connected in parallel.
Figure 17:
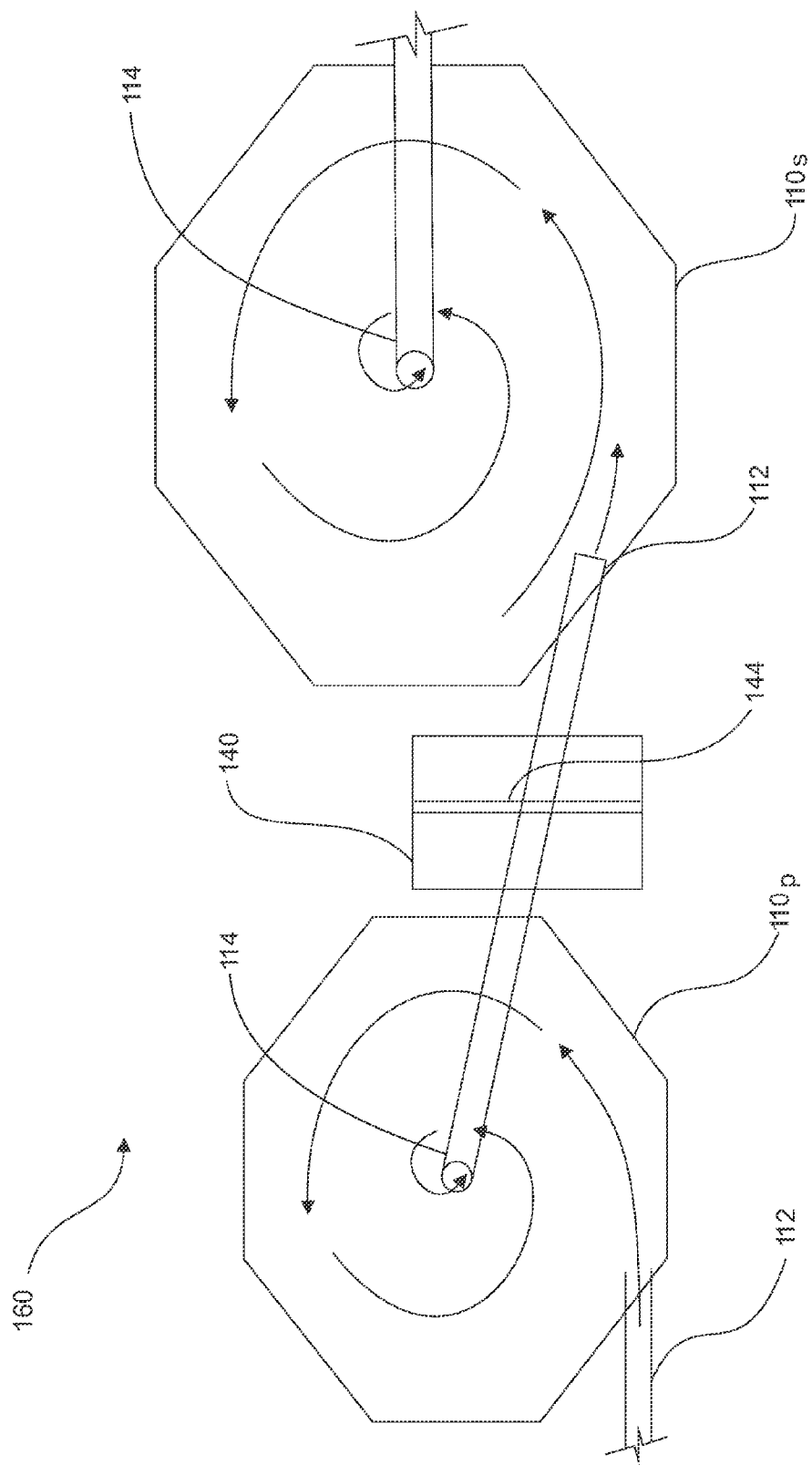
FIG. 17 is a plan view of a treatment train incorporating two or more ponds according to embodiments of the invention and one or more control structures positioned external to the ponds therein.

As shown in FIGS. 15-17, two or more ponds 110 according to embodiments of the invention may be fluidly connected to form a treatment train 160 in an overall stormwater management system. A primary pond 100p and one or more sequential downstream ponds 110s, fluidly connected either in series (FIG. 15) or in parallel (FIG. 16), may be designed to have different retention times so as to permit density-based separation of stormwater contaminants, such as is required for the deposition of sediment of different sizes or the retention of oils or other floating constituents therein. Alternately or simultaneously, one or more of the sequential downstream ponds 110s may be designed to optimally support time-dependant biochemical processes to remove certain contaminants such as hydrocarbons and nutrients. The retention time of each of the ponds 110p, 110s may be a result of the aspect ratios of the ponds 110p, 110s, available storage, resident volumes, the relative sizes of the inlet 112 and outlet 114, the types of vegetation within the pond 110 and a number of other variables which can be controlled to meet the treatment objectives of each of the ponds 110.

Typically, as is well understood in the art, an emergency spillway is provided at each of the ponds 110p, 110s in the treatment train in the event that peak water surface elevation exceeds the maximum design elevation M. The emergency spillways may discharge into a downstream pond 110s, or directly into a natural wetland, river or lake or the like as is also known in the art.

Ponds 110s, typically downstream from a primary pond 110p as described herein, may form a treatment wetland. As known in the art of treatment wetlands, embodiments of the invention may be designed to utilize contaminant removal processes other than density-based separation. Such alternative processes strongly correlate to hydraulic retention time, also known as contact time or aged water and may include, but are not limited to, one or more of adsorption, mineralization, flocculation, filtration, volatilization, biological metabolism, reduction, oxidation and adjustment of pH.

As shown in FIG. 17, control structures 140 may be incorporated into the treatment train 160. A single control structure 140 may be used, typically downstream from the most downstream pond 110s, to control the behavior of the entire system.

Alternatively, a plurality of control structures 140 may be incorporated into the treatment train 160 at select ponds 110s only or between each of the ponds 110s, depending upon design criteria.

EXAMPLE

The following example is for illustrative purposes only. Ponds 110 according to embodiments of the invention may be designed to handle widely varying inflow rates as well as to meet different treatment objectives.

A forebay or upstream pond 110p, designed to handle a peak inflow rate of about 9 m$^3$ per second, contains a minimum resident storage volume of about 5,000 m$^3$ prior to any stormwater runoff event. The upstream pond 110p has an inlet 112, a pipe having a diameter of between about 1-4 m, typically about 1.5-2 m. The upstream pond 110p is designed to contain about 15,000 m$^3$ when filled to a spill crest or maximum elevation. The central outlet 114 is sized to discharge so as not to discharge when the volume of the upstream pond is at the storage volume of 5,000 m$^3$ and to discharge to a downstream pond 110s at about 3 m$^3$ per second when the storage volume in the upstream pond 110p is about 15,000 m$^3$. The storage capacity of the upstream pond 110p permits the capacity of the outlet 114 to be reduced significantly relative to the expected peak inflow rate in pond 110p.

The downstream pond 110s is much larger than the upstream pond 110p, having a capacity to store a volume of about 50,000 m$^3$ and is expected to maintain a more quiescent flow during and after filling compared to the upstream pond 110p. The downstream pond 110s stores a minimum of about 20,000 m$^3$ of water, receiving water from the upstream pond 110p. The downstream pond 110s receives at least partially clarified water from the central outlet 114 of the upstream pond 110p as a result of the fully developed spiral pathway induced therein according to the invention. The central outlet 114 in the downstream pond 110s is sized so as to discharge about 1 m$^3$ to a subsequent downstream pond 110s or other water body when the storage volume is about 50,000 m$^3$. The fully developed spiral pathway in the larger, downstream pond 110s creates a longer retention time in the downstream pond 110s than in the upstream pond 110p so as to permit the removal of contaminants therefrom and to permit the deposit of finer sediments therein.

Alternately, the upstream pond 110p may discharge at least partially clarified water to one or more downstream ponds 110s each having a smaller storage volume than a single downstream pond 110s, the combined downstream storage volume being about 50,000 m$^3$.

The invention claimed is:

1. A pond for receiving and flowing an inflow of contaminated water therethrough, the pond comprising:
   a pond basin for substantially containing the inflow of contaminated water, the pond having a pond volume comprising at least a resident volume being initially substantially quiescent and having a large rotational inertia prior to receiving the inflow of contaminated water;
   an inlet for introducing the inflow of contaminated water to the pond substantially tangential to a periphery of the pond, thereto; and
   an outlet positioned at about a centre of the pond for discharging at least a portion of the pond volume therethrough, the outlet being at an elevation above a bottom of the pond for maintaining the at least a resident volume in the pond, the discharging of the at least a portion of the pond volume therefrom and the inflow of contaminated water at the inlet causing the pond volume to flow in a spiral flow path from the inlet to the outlet,
   wherein at least a portion of the resident volume is directed to the outlet, ahead of the inflow of contaminated water, a hydraulic retention time of the contaminated water in the pond being sufficiently long so as to permit removal of at least a portion of the contaminants therein and to discharge a substantially clarified water stream at the central outlet.

2. The pond of claim 1 wherein the outlet has a maximum rate of discharge less than a maximum rate of contaminated water inflow at the inlet.

3. The pond of claim 1 further comprising:
   a structure positioned within the pond and adjacent to the inlet for directing the inflow of contaminated water and at least a portion of the resident water into a leading edge of the spiral flow path as the spiral flow path develops within the pond volume.

4. The pond of claim 3 wherein the structure is a surface flow-resistance element.

5. The pond of claim 3 wherein the structure is a berm.

6. The pond of claim 1 wherein the outlet is a discharge pipe extending upwardly from the bottom of the pond, the discharge pipe having a graduated discharge capacity through a plurality of graduated, sized orifices in the pipe relative to an elevation of water in the pond.

7. The pond of claim 6 wherein the discharge pipe further comprises a floating cover for preventing floating debris from discharging therefrom with the substantially clarified water stream.

8. The pond of claim 1 further comprising a circulation pump in the pond volume having a discharge substantially tangential to the pond periphery and in the same rotational direction as the inlet so as to impart a minimal rotational energy in the pond to assist in at least developing the spiral flow path.

9. The pond of claim 1 wherein a horizontal to vertical aspect ratio of the pond is greater than about 10:1.

10. The pond of claim 1 further comprising a control structure positioned external to the pond, the control structure housing control means for controlling water surface elevation in the pond and the rate of discharge of water at the outlet, the control means being fluidly connected to the central outlet.

11. The pond of claim 10 wherein the control means comprises a weir having an overflow for controlling a high flow elevation in the pond and an orifice in the weir spaced below a top and above an elevation of the central outlet for controlling the resident volume in the pond.

12. The pond of claim 10 further comprising a circulation pump in the control structure having a discharge substantially tangential to the pond periphery and in the same direction as the inlet so as to pump fluid, removed from the centre of the pond by the central outlet back into the pond.

13. The pond of claim 12 wherein the circulation pump is a continuously operating circulation pump.

14. The pond of claim 12 wherein the circulation pump is an intermittently operating circulation pump.

15. The pond of claim 12 wherein the circulation pump is an aeration pump.

16. The pond according to claim 12 wherein the circulation pump permits the addition of chemical or biologically active substances to the water in the pond.

17. A system for clarification of contaminated water, containing contaminants therein, from a contaminated water event comprising:
   an upstream pond and one or more downstream ponds, according to claim 1, wherein a substantially clarified stream discharged from the central outlet of the upstream pond is directed to an inlet of at least one of the one or more downstream ponds.

18. The system of claim 17 wherein a storage volume of the one or more downstream ponds is greater than a storage volume of the upstream pond.

19. The system of claim 17 wherein the upstream pond and the one or more downstream ponds are fluidly connected in series.

20. The system of claim 17 wherein the upstream pond and two or more of the one or more downstream ponds are fluidly connected in parallel.

21. The system of claim 17 wherein the upstream pond is a wetland and one or more of the one or more downstream ponds is a wetland.

22. A method for clarifying an inflow of contaminated water therein to a pond, the pond having a substantially clarified, resident volume of water having a large rotational inertia and being substantially quiescent therein, the method comprising:
   flowing the inflow of contaminated water through an inlet, substantially tangential to a periphery of the resident volume of water for displacing at least a portion of the resident volume of water toward a central outlet; and
   continuing to flow the inflow of contaminated water through the inlet for overcoming the large rotational inertia of the resident volume of water and expanding an initial tight leading edge vortex to form an expanding spiral flow path for directing at least a portion of the resident volume of water toward the central outlet,
   wherein
   the inflow of contaminated water overcomes the large rotational inertia of the resident water for expanding the expanding spiral flow path to flow substantially about the periphery of the pond and slowly to the central outlet, increasing a hydraulic retention time of the inflow of contaminated water within the pond permitting removal of at least a portion of the contaminants therein to the pond.

23. The method of claim 22 further comprising:
pumping at least a portion of the resident volume of water in the pond, tangential and in the same rotational direction as the inflow of contaminated water at the inlet, for imparting a minimal rotational energy to the resident volume of water in the pond for assisting in at least developing the spiral flow path.

24. The method of claim 22 further comprising:
removing at least a portion of the resident volume of water in the pond from the central outlet; and
pumping the removed portion of the resident volume of water from the pond into the pond, tangential and in the same rotational direction as the inflow of contaminated water at the inlet, for overturning at least the resident volume of water in the pond.

25. The method of claim 24 further comprising:
aerating the removed portion of the resident volume of water prior to pumping the removed portion back into the pond for aerating at least the resident volume of water in the pond.

26. The method of claim 24 further comprising:
adding one or more of chemicals or biologically active substances to the removed portion of the resident volume of water prior to pumping the removed portion back into the pond for treating at least the resident volume of water in the pond.

27. The method of claim 22 further comprising:
displacing the at least a portion of the resident volume of water from the central outlet to an inlet of one or more downstream ponds, the one or more downstream ponds being fluidly connected thereto in series.

28. The method of claim 22 further comprising:
displacing the at least a portion of the resident volume of water from the central outlet to inlets of two or more downstream ponds, the two or more downstream ponds being fluidly connected thereto in parallel.

* * * * *